(12) United States Patent
Zhu

(10) Patent No.: US 12,526,038 B2
(45) Date of Patent: Jan. 13, 2026

(54) METHOD FOR WIRELESS COMMUNICATION AND COMMUNICATION DEVICE

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 406 days.

(21) Appl. No.: 18/262,160

(22) PCT Filed: Jan. 22, 2021

(86) PCT No.: PCT/CN2021/073274
§ 371 (c)(1),
(2) Date: Jul. 19, 2023

(87) PCT Pub. No.: WO2022/155886
PCT Pub. Date: Jul. 28, 2022

(65) Prior Publication Data
US 2024/0088991 A1    Mar. 14, 2024

(51) Int. Cl.
*H04B 7/185*    (2006.01)

(52) U.S. Cl.
CPC ..... *H04B 7/18513* (2013.01); *H04B 7/18534* (2013.01)

(58) Field of Classification Search
CPC ............ H04B 7/18513; H04B 7/18534; H04B 7/1853; H04B 7/18578; H04B 7/1851
See application file for complete search history.

(56) References Cited

U.S. PATENT DOCUMENTS

| 6,701,126 | B1 * | 3/2004 | Draim ................ B64G 1/244 |
| | | | 455/12.1 |
| 6,990,314 | B1 * | 1/2006 | Hagen ............... H04B 7/18534 |
| | | | 455/13.1 |
| 10,447,380 | B1 | 10/2019 | Lu et al. |
| 2016/0277095 | A1 * | 9/2016 | Marsh ............... H04B 7/18513 |
| 2018/0375570 | A1 | 12/2018 | Us |
| 2020/0212995 | A1 | 7/2020 | Lu et al. |
| 2021/0067240 | A1 | 3/2021 | Lofquist |
| 2023/0188201 | A1 | 6/2023 | Lofquist |

FOREIGN PATENT DOCUMENTS

| CN | 1199289 A | 11/1998 |
| CN | 110679097 A | 1/2020 |
| CN | 110830093 A | 2/2020 |
| CN | 111182658 A | 5/2020 |

OTHER PUBLICATIONS

Lee, Yonghwa, and Jihwan P. Choi. "Performance evaluation of high-frequency mobile satellite communications." IEEE Access 7 (2019): 49077-49087. (Year: 2019).*
International Search Report & Written Opinion issued Jul. 8, 2021 in PCT/CN2021/073274, filed on Jan. 22, 2021, 14 pages (with English Translation).
Extended European Search Report issued Feb. 26, 2024, in corresponding European Patent Application No. 21920284.3, 8 pages.

* cited by examiner

*Primary Examiner* — Sharad Rampuria
(74) *Attorney, Agent, or Firm* — Oblon, McClelland, Maier & Neustadt, L.L.P.

(57) ABSTRACT

Aspects of the disclosure are directed to a method for wireless communication that can include simultaneously transmitting data on a plurality of beams of a satellite.

16 Claims, 12 Drawing Sheets

METHOD FOR WIRELESS COMMUNICATION AND COMMUNICATION DEVICE

CROSS REFERENCE TO RELATED APPLICATIONS

This application is a national phase application based on International Application No. PCT/CN2021/073274, filed Jan. 22, 2021, the entire content of which is incorporated by reference.

BACKGROUND

Technical Field

The present disclosure relates to, but is not limited to, the field of wireless communication technologies, in particular to, a method for wireless communication and a communication device.

Description of the Related Art

Non-terrestrial networks (NTN), especially satellite communication networks, have characteristics of wide coverage, a strong capacity of resistance on disasters, and a large capacity. The NTN may be served as a supplement to terrestrial networks of the 5th-generation (5G) mobile communication network, providing a continuous service for IoT (Internet of Things) devices and mobile platform users, causing a reliability of the 5G network to be enhanced, as well as directly providing a broadcast or multicast service to user devices at the edge of the network, causing a scalability of the 5G network to be enhanced, also provide a network service for users in a remote region and an isolated island, etc., causing the network service ubiquitous.

SUMMARY

According to a first aspect of embodiments of the present disclosure, there is provided a method for wireless communication, performed by a terminal. The method can include simultaneously transmitting data on a plurality of beams of a satellite.

According to a second aspect of embodiments of the present disclosure, there is provided a method for wireless communication, performed by a base station. The method can include simultaneously transmitting data on a plurality of beams of a satellite.

According to a third aspect of embodiments of the present disclosure, there is provided a communication device. The communication device includes a processor and a memory configured to store instructions executable by the processor. The processor, when running the executable instructions, is configured to implement simultaneously transmitting data on a plurality of beams of a satellite.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION OF THE
PREFERRED EMBODIMENTS

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the present disclosure as recited in the appended claims.

Terms used herein in embodiments of the present disclosure are only for the purpose of describing specific embodiments, but should not be construed to limit the present disclosure. As used in the embodiments of the present disclosure and the appended claims, "a/an" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these pieces of information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

For purposes of simplicity and ease of understanding, the terms "greater than" or "less than" used herein may represent a size relationship. However, for those skilled in this art, it can be understood that the term "greater than" also covers the meaning of "greater than or equal to", and the term "less than" also covers the meaning of "less than or equal to".

Figure 1:
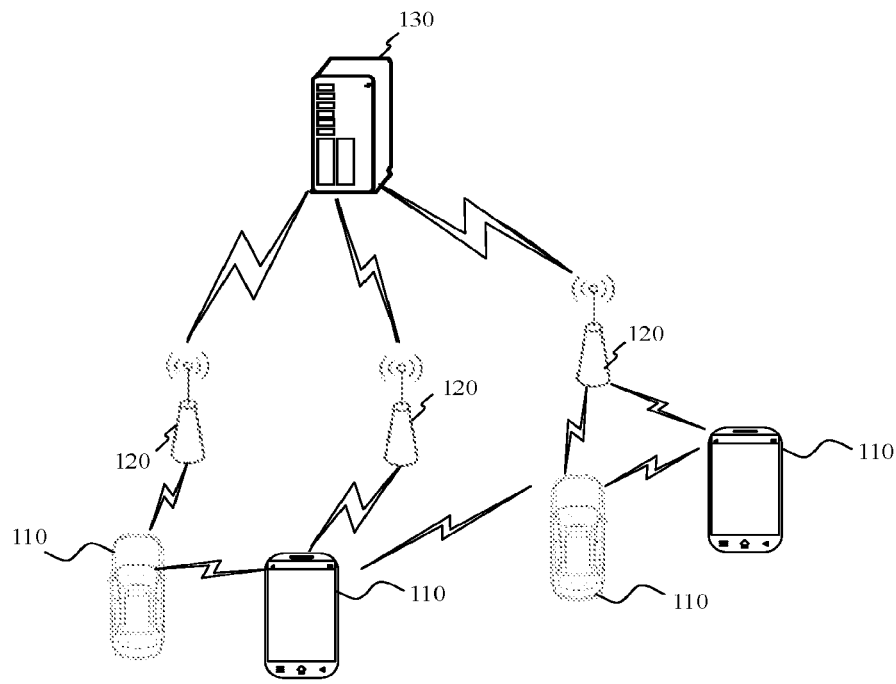
FIG. 1 is a schematic diagram illustrating a structure of a wireless communication system.

Please referring to FIG. 1, FIG. 1 is a schematic diagram illustrating a structure of a wireless communication system provided in an embodiment of the present disclosure. As illustrated in FIG. 1, the wireless communication system is a communication system based on mobile communication technologies. The wireless communication system may include several user equipment 110 and several base stations 120.

The user equipment 110 may be a device that provides at least one of voice and data connectivity to a user. The user equipment 110 may communicate with one or more core networks through radio access network (RAN). The user equipment 110 may be an Internet of Things (IoT) user equipment, such as a sensor device, a mobile phone (or "cellular" phone) and a computer with the Internet of Things user equipment, such as fixed, portable, pocket, handheld, computer built-in or on-board devices. For example, a station (STA), a subscriber unit, a subscriber station, a mobile station, a mobile, a remote station, an access point, a remote terminal, an access terminal, a user terminal, a user agent, a user device, or a user equipment. Alternatively, the user equipment 110 may also be a device of an unmanned aerial vehicle. Alternatively, the user equipment 110 may also be an on-board device, for example, an onboard computer with a wireless communication function, or a wireless user equipment externally connected to the onboard computer. Alternatively, the user equipment 110 may also be a roadside device, for example, a street lamp, a signal light or other roadside devices with the wireless communication function.

The base station 120 may be a network-side device in the wireless communication system. The wireless communication system may be the 4th generation mobile communication (4G) system, also called as a Long Term Evolution (LTE) system. Alternatively, the wireless communication system may also be a 5G system, also called as a new radio (NR) system or a 5G NR system. Alternatively, the wireless communication system may also be the next generation system of the 5G system. An access network in the 5G system may be called as NG-RAN (New Generation-Radio Access Network).

The base station 120 may be an evolutionary base station (eNB) used in the 4G system. Alternatively, the base station 120 may also be a base station (gNB) used a centralized distributed architecture in the 5G system. When using the centralized and distributed architecture, the base station 120 generally includes a central unit (CU) and at least two distributed units (DUs). The centralized unit is provided with protocol stacks of a packet data convergence protocol (PDCP) layer, a radio link control (RLC) protocol layer and a media access control (MAC) layer. The distribution unit is provided with a protocol stack of a physical (PHY) layer. Embodiments of the present disclosure do not define the specific implementation mode of the base station 120.

A wireless connection may be established between the base station 12 and the terminal 11 through a wireless air-interface. In different embodiments, the wireless air-interface may be a wireless air-interface based on the 4th generation mobile communication network technology (4G) standard. Alternatively, the wireless air-interface may be a wireless air-interface based on the 5th generation mobile communication network technology (5G) standard, for example, the wireless air-interface is a new radio. Alternatively, the wireless air-interface may also be a wireless air-interface based on the next generation mobile communication network technology standard relative to 5G.

In some embodiments, a E2E (End to End) connection, such as V2V (vehicle to vehicle) communication, V2I (vehicle to infrastructure) communication, V2P (vehicle to pedestrian) communication and other scenarios in vehicle to everything (V2X) communication, may also be established between the user equipment 110.

Here, the above user equipment may be regarded as a terminal in the following embodiments.

In some embodiments, the wireless communication system described above may also include a network management device 130.

Several base stations 120 are respectively connected to the network management device 130. The network management device 130 may be the core network device in the wireless communication system. For example, the network management device 130 may be a mobility management entity (MME) in an evolved packet core (EPC). Alternatively, the network management device may also be other core network devices, such as a serving gateway (SGW), a public data network gateway (PGW), a policy and charging rules function (PCRF), or a home subscriber server (HSS), etc. Embodiments of the present disclosure do not define the implementation form of the network management device 130.

For the convenient of those skilled in the art to understand, embodiments of the present disclosure list a plurality of implementations to clearly illustrate the technical solutions of embodiments of the present disclosure. Of course, those skilled in the art may understand that the plurality of embodiments provided in embodiments of the present disclosure may be executed independently or may be executed together in combination with the methods of other embodiments in embodiments of the present disclosure, may also be executed independently or together in combination with some methods in other related arts. The embodiments of the present disclosure will not limit this.

In order to better understand the technical solution as described in any embodiment of the present disclosure, relevant applications and scenarios are first described.

New Internet applications such as augmented reality (AR) and virtual reality (VR) continuously emerge, having put forward higher requirements for the wireless communication technology, and causing continuous evolution of the wireless communication technology to meet requirements of applications.

An important characteristic of the new generation technology is to support flexible configuration of a plurality of business types. Different business types have different requirements for the wireless communication technology. For example, a primary requirement of a business type of enhanced mobile broad band (eMBB) is focused on aspects of large bandwidth and high speed. A primary requirement of a business type of ultra reliable low latency communication (URLLC) is focused on aspects of high reliability and low latency. A primary requirement of a business type of massive machine type communication (mMTC) is focused on an aspect of a large number of connections. Therefore, the new generation of wireless communication systems requires flexible and configurable designs to support transmission of the plurality of business types.

In the wireless communication technology, satellite communication is considered an important aspect of future development of the wireless communication technology. The satellite communication refers to a communication performed by a terrestrial radio communication device using a satellite as a relay. The satellite communication system consists of a satellite part and a terrestrial part. The satellite communication has characteristics of a large communication range, communication capable of being performed between any two points within a range covered by radio waves emitted by the satellite, without being affected by land disasters, a high reliability.

As a supplement to a terrestrial communication system, the satellite communication has the following characteristics of: 1. extending coverage, that the problem of communication may be solved through the satellite communication for regions where a cellular communication system cannot cover or can be covered with high costs, such as an ocean region, a desert region, and a remote mountain regions; 2. emergency communication that a communication connection may be quickly established through the satellite communication under a condition that infrastructures of the cellular communication is unavailable resulted by extreme situations where a disaster (such as an earthquake, etc.) occurs; 3. providing enterprise applications, that, for example, a delay of the business transmission may be reduced by means of the satellite communication for delay-sensitive businesses transmitted over a long distance.

In the wireless communication system, the satellite communication system and the terrestrial cellular communication system will gradually achieve deep integration, truly realizing the intelligent connection of all things.

Compared to a typical 5G network, an integrated satellite-terrestrial NTN and an independent NTN both have a significant impact on performance such as coverage, a user bandwidth, a system capacity, a service reliability, a service availability, an energy consumption, and a connection density, capable of providing users with a more reliable and consistent service experience, reducing network deployment costs for operators, connecting multi-dimensional spaces such as space, air, sky, land, and sea, and forming an integrated ubiquitous network pattern.

Figure 2:
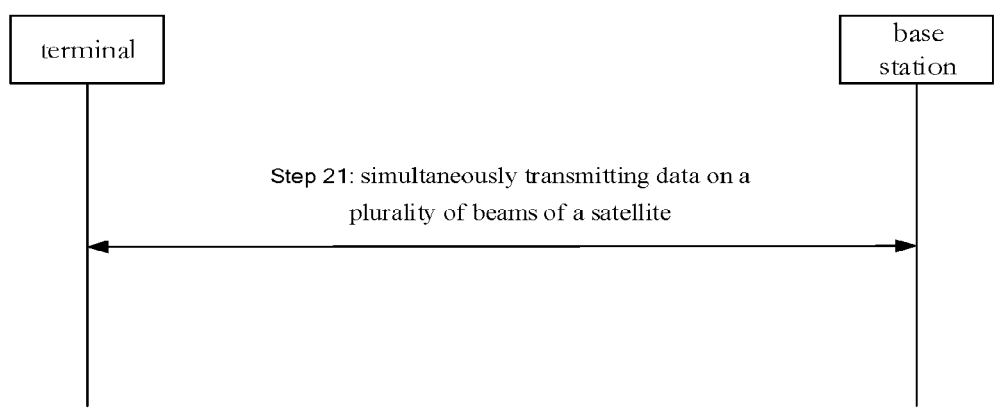
FIG. 2 is a flowchart illustrating a method for wireless communication according to an exemplary embodiment.

As illustrated in FIG. 2, this embodiment provides a method for wireless communication, performed by a terminal. The method includes the following step.

At step 21, data is simultaneously transmitted on a plurality of beams of a satellite. The satellite may be a flying base station or a flight device for transmitting data between a terminal and a base station. The base station may be an interface device for terminal access to the network. Herein, the base stations may be various types of base stations, such as a base station of the third generation mobile communication (3G) network, a base station of the fourth generation mobile communication (4G) network, a base station of the fifth generation mobile communication (5G) network, or other evolutionary base stations. Herein, the satellite may be a low earth orbiting (LEO) satellite. It should be noted that with the evolution of satellite wireless communication networks, the satellite may also be a medium earth orbiting (MEO) satellite or a geostationary earth orbiting (GEO) satellite.

In an embodiment, the satellite may be deployed in an airspace with a density of terrestrial base stations is less than a density threshold, and a channel quality in a wireless communication environment is less than a quality threshold, for example, an airspace where a remote mountain region and/or an ocean is located.

This terminal may be, but is not limited to, a mobile phone, a wearable device, a vehicle mounted terminal, a road side unit (RSU), a smart home terminal, an industrial sensing device, and/or a medical device, etc.

In an embodiment, the data is simultaneously transmitted on a plurality of beams of one satellite or on a plurality of beams of a plurality of satellites.

In an embodiment, the data is simultaneously transmitted on the plurality of beams of the same satellite. Herein, simultaneously transmitting the data may be simultaneously receiving or sending the data. In this way, a speed of transmitting data between the terminal and the base station may be improved.

Figure 3:
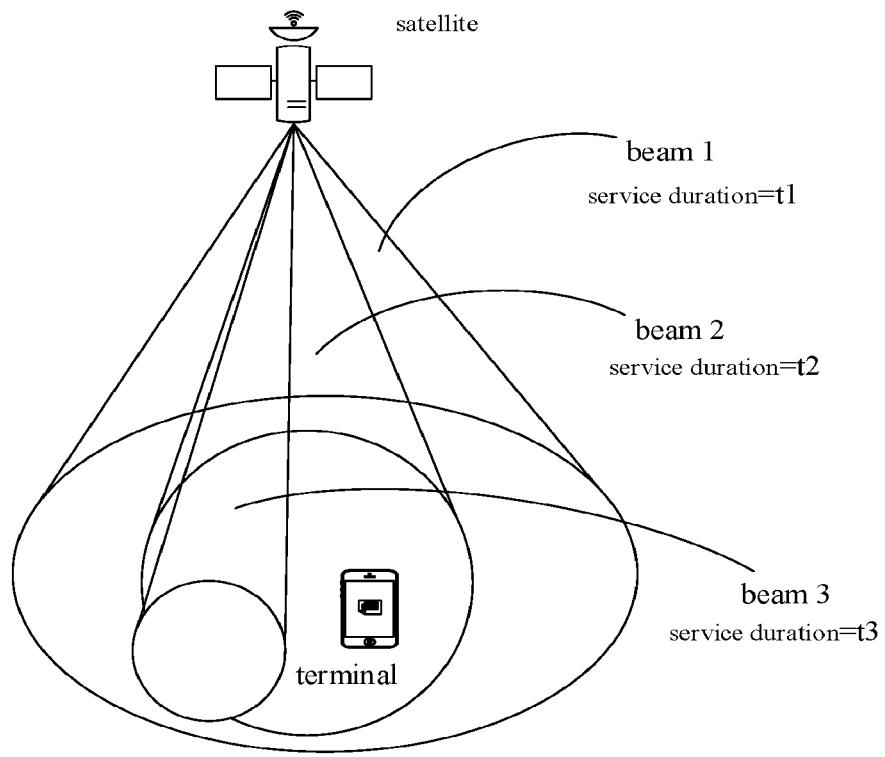
FIG. 3 is a is a schematic diagram illustrating signal coverage of a satellite beam according to an exemplary embodiment.

In an embodiment, please referring to FIG. 3, one satellite may send or receive the data on the plurality of beams. For example, one satellite may send or receive the data on three beams, namely a beam 1, a beam 2, and a beam 3. Herein, different beams have different signal coverage ranges and/or service times. For example, a signal coverage range of the beam 1 is greater than a signal coverage range of each of the beam 2 and the beam 3. For example, a service duration of the beam 2 is greater than a service duration of each of the beam 1 and the beam 3, i.e. t2>t1>t3. Herein, each beam of the plurality of beams may provide a service to a terminal within the signal coverage range of that beam. Herein, the plurality of beams may simultaneously provide a service to the terminal in a region simultaneously covered by signals of the plurality of beams. In this way, a transmission speed for transmitting the data between the terminal and the base station may be improved.

In an embodiment, the data is transmitted simultaneously on the plurality of beams of different satellites. Herein, simultaneously transmitting the data may be simultaneously receiving or sending the data. In this way, the speed for transmitting the data between the terminal and the base station may be improved.

Figure 4:
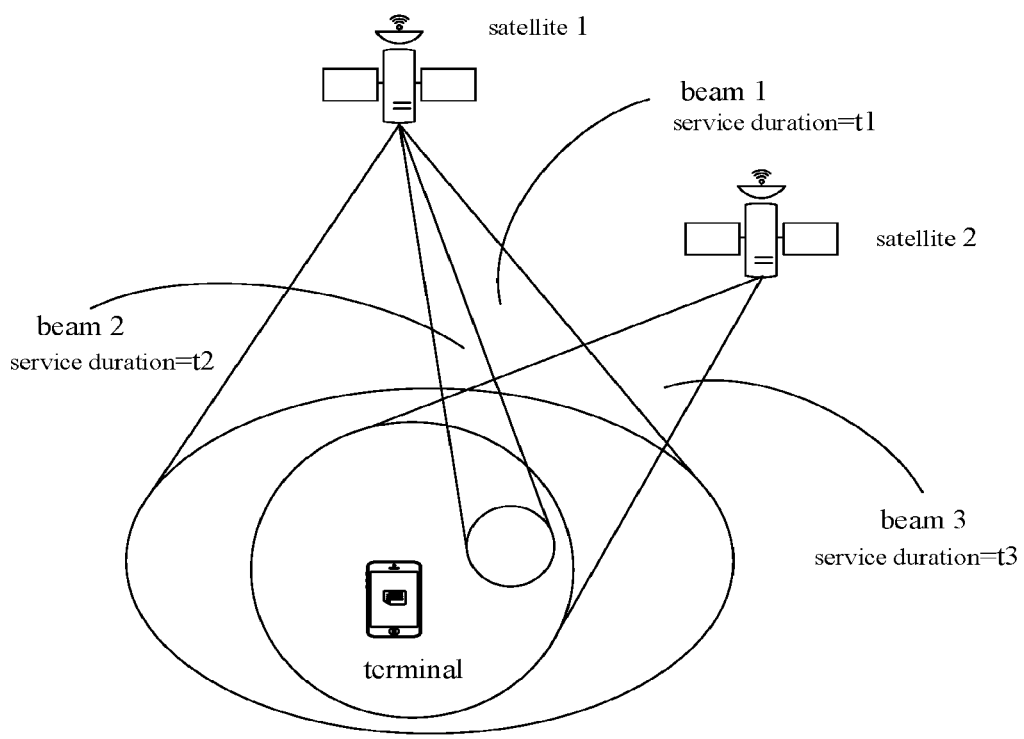
FIG. 4 is a is a schematic diagram illustrating signal coverage of a satellite beam according to an exemplary embodiment.

In an embodiment, please referring to FIG. 4, the plurality of beams may be working beams of the plurality of satellites. For example, beams of a satellite 1 are a beam 1 and a beam 2, and a beam of a satellite 2 is a beam 3. Herein, different satellites have different orbit altitudes and/or operating velocities relative to a ground. For example, an orbit altitude of the satellite 1 is greater than an orbit altitude of the satellite 2, or an operating velocity of the satellite 1 is lower than an operating velocity of the satellite 2. Herein, beams of different satellites have different signal coverage ranges and/or service times. For example, a signal coverage range of the beam 1 is greater than a signal coverage range of the beam 3. For another example, a service duration of the beam 1 is greater than a service duration of the beam 3, i.e. t1>t3. Herein, each beam of different satellites may provide a service for a terminal within a signal coverage range of that beam. Herein, beams of different satellites may simultaneously provide a service to a terminal in a region simultaneously covered by signals of the beams of those different satellites.

In an embodiment, the terminal may receive configuration information of the plurality of beams sent by the base station, and simultaneously transmit the data on the plurality of beams indicated by the configuration information. Herein, simultaneously transmitting the data may be simultaneously receiving or sending the data.

In an embodiment, the satellite may send the configuration information to the terminal by means of a unicast mode. In another embodiment, the satellite may send the configuration information to the terminal by means of broadcasting.

In an embodiment, the configuration information may be sent to the terminal when the terminal is in a radio resource control (RRC) connected state or in a RRC non-connected state. For terminals in the RRC connected state, the satellite may send the configuration information to each terminal through a system message, a RRC signaling, or a downlink control information (DCI) signaling. For terminals in the RRC non-connected state, the satellite may send the configuration information to each terminal through the system message. In this way, multiplexing of the RRC signaling, the system message, or the downlink control information is achieved, compatibility of signaling is improved.

In an embodiment, the configuration information includes one or more of following information of beam information:
  identifier (ID) information of the beams;
  frequency point information of the beams;
  bandwidth information of the beams; or
  service time information of the beams.

In an embodiment, the data may be transmitted simultaneously on the plurality of beams indicated by the ID information of the beams in the configuration information.

Herein, a beam indicated by the ID information of the beam may be a beam scheduled for performing data transmission by the terminal. Alternatively, the beam indicated by the ID information of the beam may be a beam selected by the terminal for data transmission. Herein, it should be noted that after the terminal selects the beam, the beam is still required to be uniformly scheduled by the base station for data transmission. In an embodiment, the terminal may send a scheduling request carrying a selected beam to the base station, and the base station may determine a beam for the terminal the perform data transmission based on the scheduling request.

In an embodiment, frequency points of different beams may be the same or different.

In an embodiment, bandwidths of different beams may be the same or different.

In an embodiment, the service time information of the beam may include information of time points. For example, the service time information includes information of a time point 1 and a time point 2, that is, the service time information indicates a duration between the time point 1 and the time point 2. In another embodiment, the service time of the beam may also include information of a time point and information of a duration. For example, the service time information includes a time point 1 and a duration 1, that is, the service time information indicates a time period corresponding to the time point 1 and the duration 1.

In an embodiment, the service time information is determined based on the orbit altitude and/or the operating velocity of the satellite relative to the ground. In an embodiment, in response to the orbit altitude of the satellite relative to the ground being greater than an altitude threshold, it is determined that the duration indicated by the service time information is greater than a duration threshold, and in response to the orbit altitude of the satellite relative to the ground being less than the altitude threshold, it is determined that the duration indicated by the service time information is less than the duration threshold. In another embodiment, in response to the operating velocity of the satellite relative to the ground being greater than an operating velocity threshold, it is determined that the duration indicated by the service time information is less than the duration threshold, and in response to the operating velocity of the satellite relative to the ground being less than the operating velocity threshold, it is determined that the duration indicated by the service time information is greater than the duration threshold.

In an embodiment, the beam information in the configuration information may include different types of beam information. For example, the beam information may include beam information of a primary beam and beam information of a secondary beam. Herein, a coverage range of the primary beam is greater than a coverage range of the secondary beam, and/or a service duration of the primary beam is greater than a coverage range of the secondary beam. Herein, beams indicated by different types of beam information may use a same frequency domain resource or different frequency domain resources.

Figure 5:
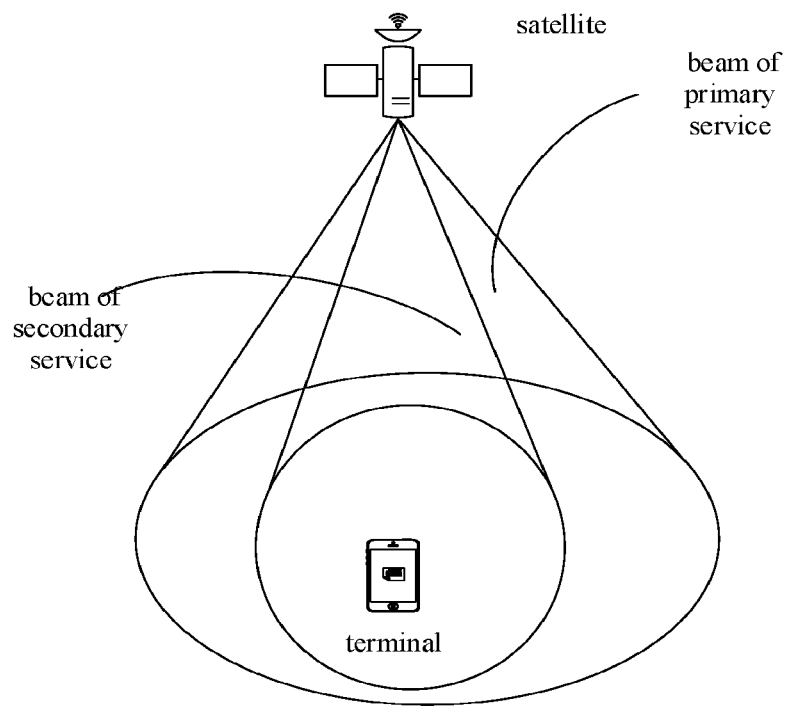
FIG. 5 is a is a schematic diagram illustrating signal coverage of a satellite beam according to an exemplary embodiment.

In an embodiment, please referring to FIG. 5, the satellite sends the configuration information including the beam information to the terminal. The beam information includes the beam information of the primary beam and the beam information of the secondary beam. The terminal simultaneously transmits data of the base station on the primary beam and the secondary beam of the satellite. In this way, the speed of data transmission between the terminal and the base station may be improved. Herein, it should be noted that a plurality of secondary beams may be provided. The base station may select any number of secondary beams from the plurality of secondary beams for the terminal to perform data transmission.

Figure 6:
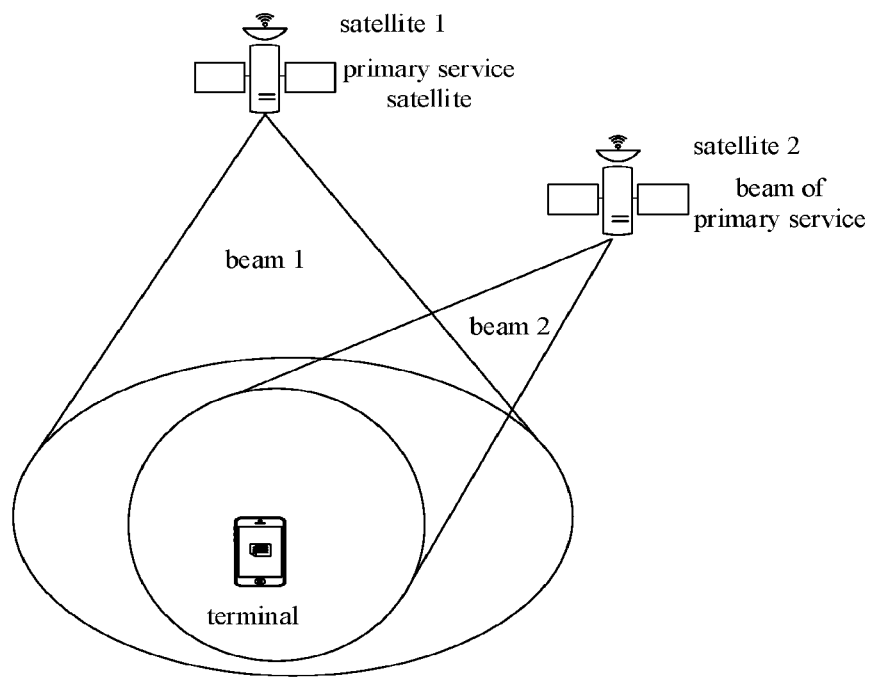
FIG. 6 is a is a schematic diagram illustrating signal coverage of a satellite beam according to an exemplary embodiment.

In an embodiment, please referring to FIG. 6, the beam of the satellite 1 is the beam 1, and the beam of the satellite 2 is the beam 2. The terminal may communicate with the base station through the beam 1 of the satellite 1 and the beam 2 of the satellite 2. In an embodiment, the terminal simultaneously transmits the data on the beam 1 of the satellite 1 and the beam 2 of the satellite 2. In this way, the transmission speed of data transmission between the terminal and the base station may be improved.

In an embodiment, the terminal may determine a primary service satellite and a secondary service satellite based on ephemeris information. In an embodiment, the ephemeris information includes information about the orbit altitude. In response to the orbit altitude of the satellite being greater than the altitude threshold, it is determined that the satellite is the primary service satellite, and in response to the orbit altitude of the satellite being less than the altitude threshold, it is determined that the satellite is the secondary service satellite. In an embodiment, the terminal simultaneously transmits the data on a beam of the primary service satellite and a beam of the secondary service satellite. In this way, the transmission speed of data transmission between the terminal and the base station may be improved. Herein, it should be noted that a plurality of secondary service satellites are provided. The base station may select any number of secondary service satellites from the plurality of secondary service satellites for terminal to preform data transmission.

In an embodiment, the terminal may receive configuration information of the primary service base station and/or the secondary service base station sent by the primary service base station before simultaneously transmitting the data using the beam of the primary service satellite and the beam of the secondary service satellite. Herein, the configuration information includes one or more of the following information of beam information: the ID information of the beams, the frequency point information of the beams, the bandwidth information of the beams, and the service time information of the beams.

In an embodiment, in response to a transmission speed to be transmitted data by the terminal being greater than a speed threshold, the terminal sends a request message for acquiring the configuration information to the base station. After receiving the configuration information sent by the base station based on the request message, the data is transmitted simultaneously on the plurality of beams indicated by the configuration information.

In an embodiment, in response to establishing a RRC connection between the terminal and the base station, the terminal sends the request message for acquiring the configuration information to the base station. After receiving the configuration information sent by the base station based on the request message, the data is transmitted simultaneously on the plurality of beams indicated by the configuration information.

In an embodiment of the present disclosure, simultaneously transmitting the data is performed on the plurality of beams of the satellite. Here, since the data is transmitted simultaneously on the plurality of beams of the satellite, i.e. the terminal may transmit the data simultaneously on different beams at the same time, compared to a method that the data can only be transmitted on a single beam of the satellite, the data may be transmitted in parallel on the plurality of beams, capable of improving a transmission speed of data transmission between the terminal and the base station.

It should be noted that those skilled in the art can understand that the method provided in an embodiment of the present disclosure. The method may be executed independently or together with some methods in the embodiments of the present disclosure or related arts.

Figure 7:
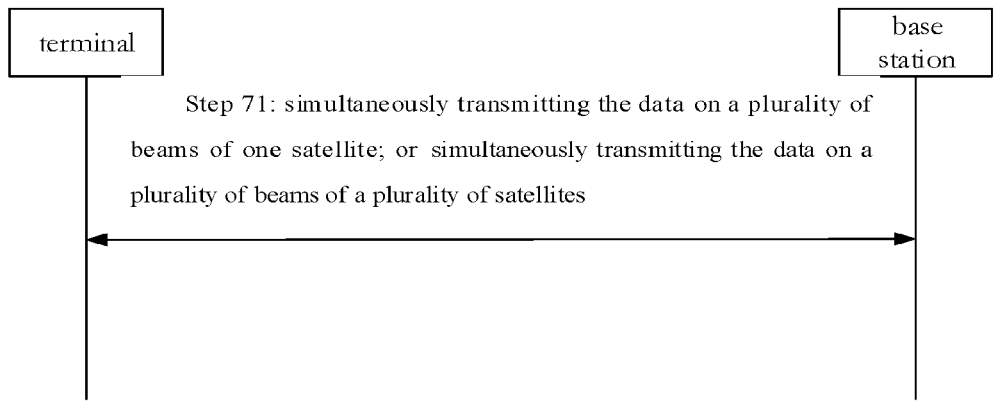
FIG. 7 is a flowchart illustrating a method for wireless communication according to an exemplary embodiment.

As illustrated in FIG. 7, this embodiment provides a method for wireless communication, performed by a terminal. The method includes the following step.

At step 71, the data is simultaneously transmitted on a plurality of beams of one satellite; or the data is simultaneously transmitted on a plurality of beams of a plurality of satellites.

In an embodiment, configuration information sent by a base station is received. The data is simultaneously transmitted on the plurality of beams of one satellite indicated by the configuration information. Herein, the data may be transmitted simultaneously on one primary beam and at least one secondary beam of one satellite indicated by the configuration information. Herein, the beam information in the configuration information may include different types of beam information. For example, the beam information may include beam information of the primary beam and beam information of the secondary beam. Herein, a coverage range of the primary beam is greater than a coverage range of the secondary beam, and/or a service duration of the primary beam is greater than a service duration of the secondary beam. Herein, beams indicated by different types of beam information may use a same frequency domain resource or different frequency domain resources.

In an embodiment, a primary service satellite and a secondary service satellite are determined based on ephemeris information. The data is simultaneously transmitted on a beam of the primary service satellite and a beam of the secondary service satellite. Herein, the data may be simultaneously transmitted on the beam of one primary service satellite and the beam of at least one secondary service satellite. Herein, in response to an orbit altitude of the satellite being greater than an altitude threshold, it is determined that the satellite is the primary service satellite, and in response to the orbit altitude of the satellite being less than the altitude threshold, it is determined that the satellite is the secondary service satellite. Here, the beams of different satellites may use a same frequency domain resource or different frequency domain resources.

It should be noted that those skilled in the art can understand that the method provided in an embodiment of the present disclosure. The method may be executed independently or together with some methods in the embodiments of the present disclosure or related arts.

Figure 8:
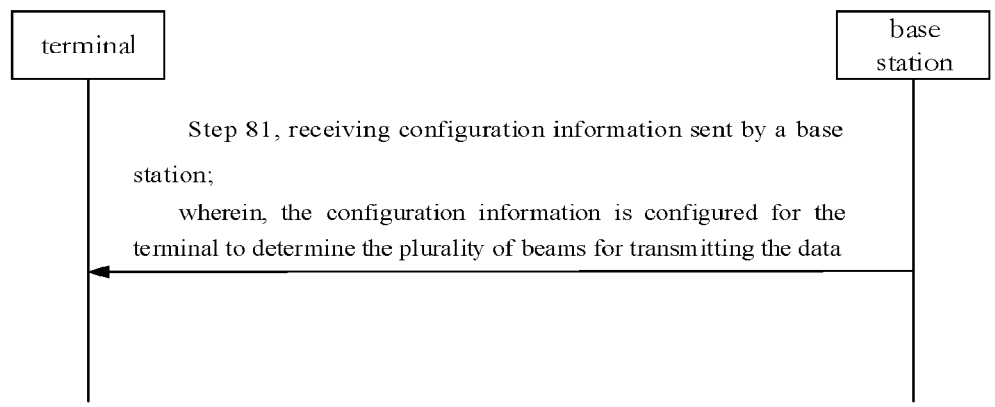
FIG. 8 is a flowchart illustrating a method for wireless communication according to an exemplary embodiment.

As illustrated in FIG. 8, this embodiment provides a method for wireless communication, performed by a terminal. The method includes the following step.

At step 81, configuration information sent by a base station is received.

The configuration information is configured for the terminal to determine the plurality of beams for transmitting the data.

In an embodiment, the configuration information includes one or more of following information of beam information:
  identifier (D) information of the beams;
  frequency point information of the beams;
  bandwidth information of the beams; or
  service time information of the beams.

In an embodiment, the configuration information may be sent by the base station or pre-stored in the terminal. In this way, when required to transmit the data, the terminal may simultaneously transmit the data on the plurality of beams of the satellite indicated by the configuration information.

In an embodiment, in response to a transmission speed to be transmitted data by the terminal being greater than a speed threshold, the terminal sends a request message for acquiring the configuration information to the base station.

After receiving the configuration information sent by the base station based on the request message, the data is transmitted simultaneously on the plurality of beams indicated by the configuration information.

In an embodiment, in response to establishing a RRC connection between the terminal and the base station, the terminal sends the request message for acquiring the configuration information to the base station. After receiving the configuration information sent by the base station based on the request message, the data is transmitted simultaneously on the plurality of beams indicated by the configuration information.

In an embodiment, the beam information includes information of a first beam, and information of a second beam; in which a coverage range of the first beam is greater than a coverage range of the second beam, and/or a service duration of the first beam is greater than a service duration of the second beam.

Herein, the first beam may be a primary beam, and the second beam may be a secondary beam. Herein, the first beam and the second beam may use a same frequency domain resource or different frequency domain resources.

In an embodiment, one satellite sends the configuration information to the terminal. The beam information in the configuration information includes the information of the first beam and the information of the second beam. The terminal simultaneously transmits the data on the first beam and the second beam of one satellite. In this way, transmission rate of data transmission between the terminal and the base station may be improved. Herein, it should be noted that a plurality of second beams are provided. The base station may select any number of second beams from the plurality of second beams for the terminal the transmit data.

It should be noted that those skilled in the art can understand that the method provided in an embodiment of the present disclosure. The method may be executed independently or together with some methods in the embodiments of the present disclosure or related arts.

Figure 9:
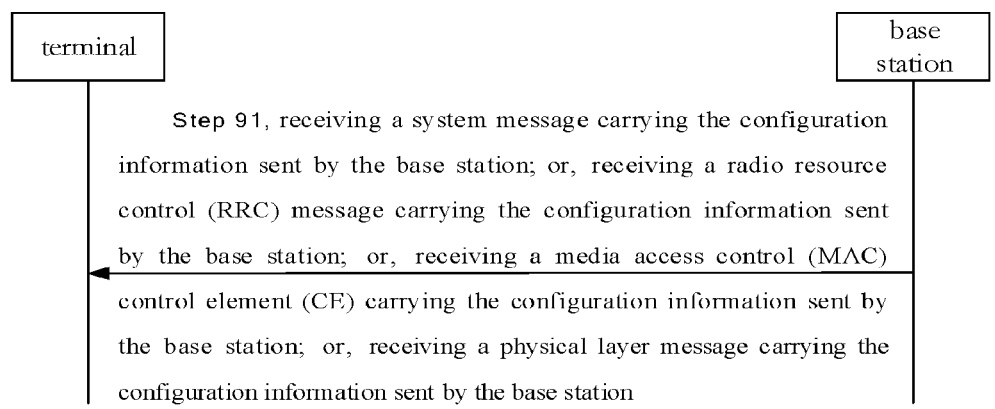
FIG. 9 is a flowchart illustrating a method for wireless communication according to an exemplary embodiment.

As illustrated in FIG. 9, this embodiment provides a method for wireless communication, performed by a terminal. The method includes the following step.

At step 91, a system message carrying the configuration information sent by the base station is received; or, a radio resource control (RRC) message carrying the configuration information sent by the base station is received; or, a media access control (MAC) control element (CE) carrying the configuration information sent by the base station is received; or, a physical layer message carrying the configuration information sent by the base station is received.

In an embodiment, the system message carrying the configuration information sent by the base station is received, and the data is simultaneously transmitted on a plurality of beams indicated by the configuration information.

In an embodiment, the RRC message carrying the configuration information sent by the base station is received, and the data is simultaneously transmitted on a plurality of beams indicated by the configuration information.

In an embodiment, the MAC CE carrying the configuration information sent by the base station is received, and the data is simultaneously transmitted on a plurality of beams indicated by the configuration information.

In an embodiment, the physical layer message carrying the configuration information sent by the base station is received, and the data is simultaneously transmitted on a plurality of beams indicated by the configuration information.

In this way, multiplexing of the RRC message, the system message, the MAC CE, and the physical layer message is achieved, compatibility of signaling is improved.

It should be noted that those skilled in the art can understand that the method provided in an embodiment of the present disclosure. The method may be executed independently or together with some methods in the embodiments of the present disclosure or related arts.

Figure 10:
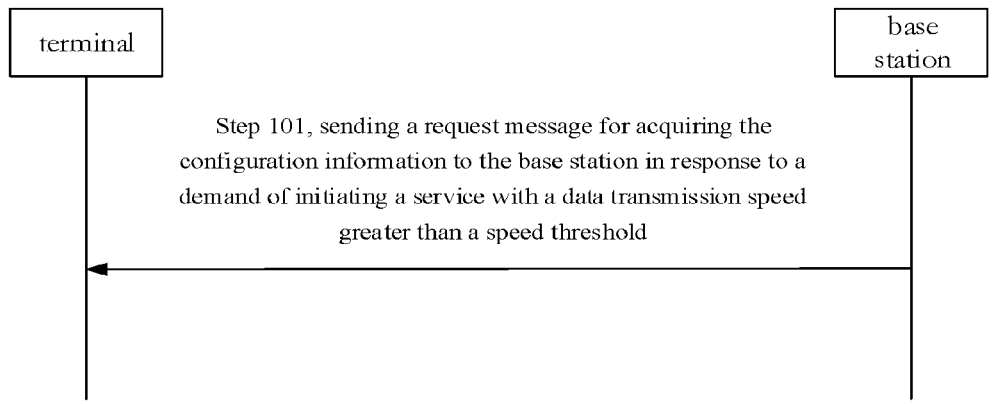
FIG. 10 is a flowchart illustrating a method for wireless communication according to an exemplary embodiment.

As illustrated in FIG. 10, this embodiment provides a method for wireless communication, performed by a terminal. The method includes the following step.

At step 101, a request message for acquiring the configuration information is sent to the base station in response to a demand of initiating a service with a data transmission speed greater than a speed threshold.

In an embodiment, the speed threshold sent by a base station may be received. In another embodiment, the speed threshold may be pre-configured in the terminal.

In an embodiment, the speed threshold is determined based on a channel environment where the data is transmitted between the terminal and the base station. In an embodiment, in response to a channel quality of data transmission between the terminal and the base station being greater than a quality threshold, it is determined that the speed threshold is greater than a predetermined value. In response to the channel quality of data transmission between the terminal and the base station being less than the quality threshold, it is determined that the speed threshold is less than the predetermined value. In this way, the speed threshold may be adapted to the channel environment.

It should be noted that those skilled in the art can understand that the method provided in an embodiment of the present disclosure. The method may be executed independently or together with some methods in the embodiments of the present disclosure or related arts.

Figure 11:
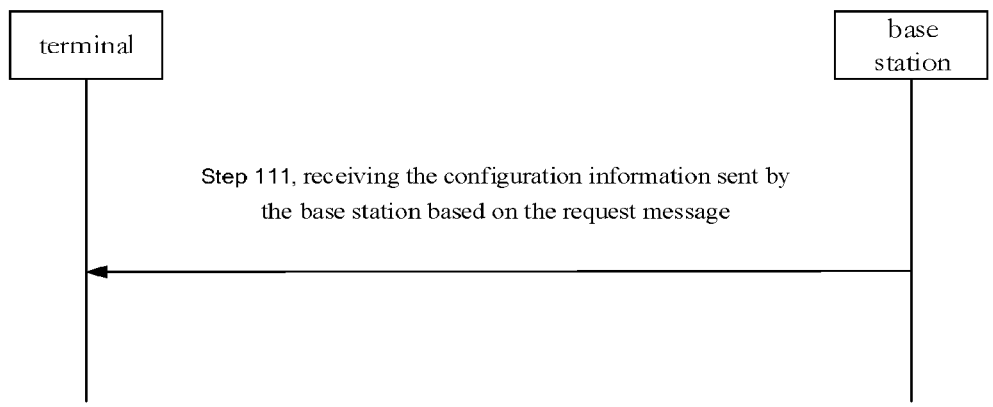
FIG. 11 is a flowchart illustrating a method for wireless communication according to an exemplary embodiment.

As illustrated in FIG. 11, this embodiment provides a method for wireless communication, performed by a terminal. The method includes the following step.

At step 111, the configuration information sent by the base station is received based on the request message. In an embodiment, the request message for acquiring the configuration information is sent to the base station in response to a demand of initiating a service with a data transmission speed greater than a speed threshold. The configuration information sent by the base station is received based on the request message.

In an embodiment, the request message may carry identifier information of a satellite, and the base station sends the configuration information of the satellite corresponding to the identifier information to the terminal based on the request message.

For example, the request message may carry an identifier information A of a satellite A, an identifier information B of a satellite B, and an identifier information C of a satellite C, then the base station may send configuration information of the satellite A, the satellite B, and the satellite C to the terminal after receiving the request message.

In an embodiment, the configuration information includes one or more of following information of beam information:
  ID information of the beams;
  frequency point information of the beams;
  bandwidth information of the beams; or
  service time information of the beams.

It should be noted that those skilled in the art can understand that the method provided in an embodiment of the present disclosure. The method may be executed independently or together with some methods in the embodiments of the present disclosure or related arts.

Figure 12:
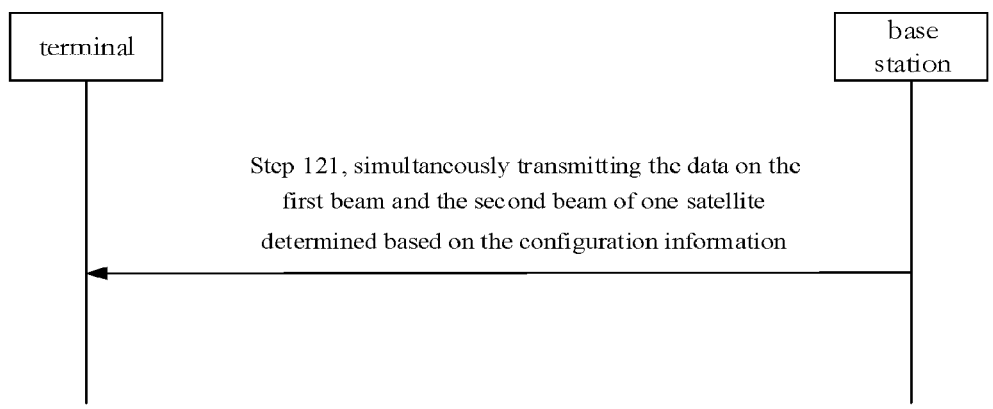
FIG. 12 is a flowchart illustrating a method for wireless communication according to an exemplary embodiment.

As illustrated in FIG. 12, this embodiment provides a method for wireless communication, performed by a terminal. The method includes the following step.

At step 121, the data is simultaneously transmitted on the first beam and the second beam of one satellite determined based on the configuration information.

In an embodiment, a coverage range of the first beam is greater than a coverage range of the second beam, and/or a service duration of the first beam is greater than a service duration of the second beam. Herein, the first beam may be a primary beam, and the second beam may be a secondary beam. Herein, the first beam and the second beam may use a same frequency domain resource or different frequency domain resources.

In an embodiment, one satellite sends the configuration information to the terminal. The configuration information includes the information of the first beam and the information of the second beam. The terminal simultaneously transmits the data on the first beam and the second beam of one satellite. In this way, transmission rate of data transmission between the terminal and the base station may be improved. Herein, it should be noted that a plurality of second beams are provided. The base station may select any number of second beams from the plurality of second beams for the terminal the transmit data.

It should be noted that those skilled in the art can understand that the method provided in an embodiment of the present disclosure. The method may be executed independently or together with some methods in the embodiments of the present disclosure or related arts.

Figure 13:
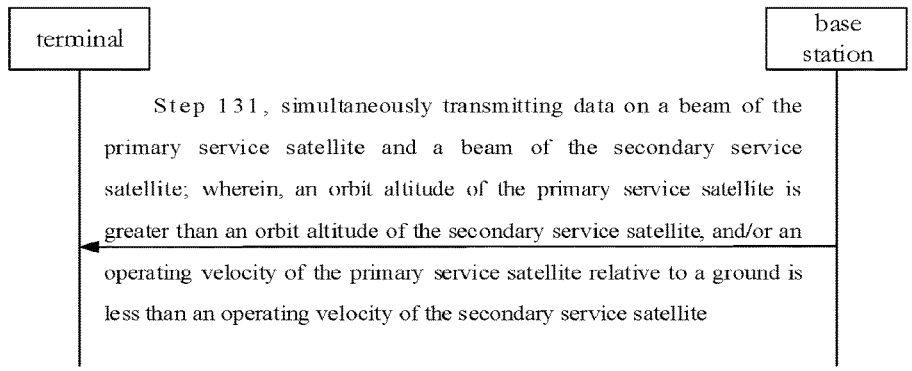
FIG. 13 is a flowchart illustrating a method for wireless communication according to an exemplary embodiment.

As illustrated in FIG. 13, this embodiment provides a method for wireless communication, performed by a terminal. The method includes the following step.

At step 131, data is simultaneously transmitted on a beam of the primary service satellite and a beam of the secondary service satellite.

An orbit altitude of the primary service satellite is greater than an orbit altitude of the secondary service satellite, and/or an operating velocity of the primary service satellite relative to a ground is less than an operating velocity of the secondary service satellite.

In an embodiment, the terminal may determine a primary service satellite and a secondary service satellite based on ephemeris information. In an embodiment, in response to the orbit altitude of the satellite being greater than the altitude threshold, it is determined that the satellite is the primary service satellite, and in response to the orbit altitude of the satellite being less than the altitude threshold, it is determined that the satellite is the secondary service satellite. In an embodiment, the terminal simultaneously transmits the data on a beam of the primary service satellite and a beam of the secondary service satellite. In this way, the transmission speed of data transmission between the terminal and the base station may be improved. Herein, it should be noted that a plurality of secondary service satellites are provided. The base station may select any number of secondary service satellites from the plurality of secondary service satellites for terminal to preform data transmission.

In an embodiment, the terminal may receive configuration information of the primary service base station and/or the secondary service base station sent by the primary service base station before simultaneously transmitting the data using the beam of the primary service satellite and the beam of the secondary service satellite.

It should be noted that those skilled in the art can understand that the method provided in an embodiment of the present disclosure. The method may be executed independently or together with some methods in the embodiments of the present disclosure or related arts.

Figure 14:
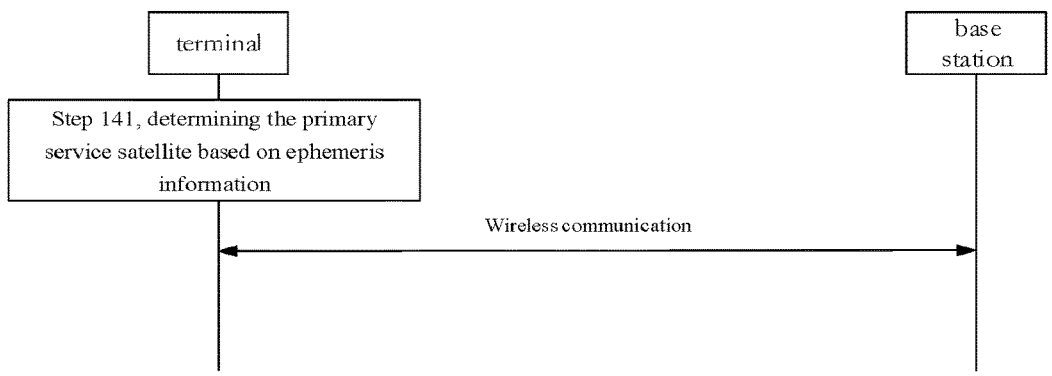
FIG. 14 is a flowchart illustrating a method for wireless communication according to an exemplary embodiment.

As illustrated in FIG. 14, this embodiment provides a method for wireless communication, performed by a terminal. The method includes the following step.

At step 141, the primary service satellite is determined based on ephemeris information.

In an embodiment, the ephemeris information may include operating velocity information of the satellite, orbit altitude information of the satellite, and operating trajectory information of the satellite.

In an embodiment, in response to an orbit altitude of the satellite being greater than an altitude threshold, it is determined that the satellite is a primary service satellite, and in response to the orbit altitude of the satellite being less than the altitude threshold, it is determined that the satellite is a secondary service satellite. In another embodiment, in response to an operating velocity of the satellite being less than an operating velocity threshold, it is determined that the satellite is the primary service satellite, and in response to the operating velocity of the satellite being greater than the altitude threshold, it is determined that the satellite is the secondary service satellite.

It should be noted that those skilled in the art can understand that the method provided in an embodiment of the present disclosure. The method may be executed independently or together with some methods in the embodiments of the present disclosure or related arts.

Figure 15:
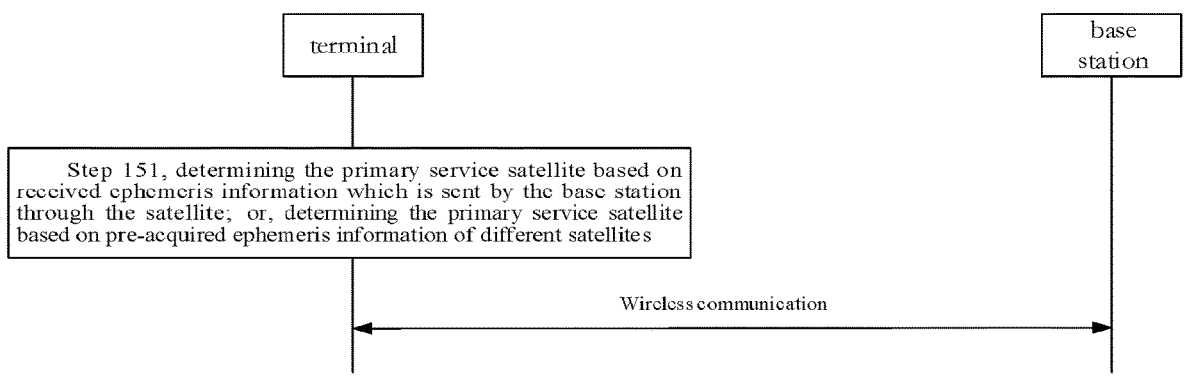
FIG. 15 is a flowchart illustrating a method for wireless communication according to an exemplary embodiment.

As illustrated in FIG. 15, this embodiment provides a method for wireless communication, performed by a terminal. The method includes the following step.

At step 151, the primary service satellite is determined based on received ephemeris information which is sent by the base station through the satellite; or, the primary service satellite is determined based on pre-acquired ephemeris information of different satellites.

In an embodiment, a base station sends a system message carrying ephemeris information of each corresponding satellite to the terminal through different satellites. After receiving the system message, the terminal determines the primary service satellite based on the ephemeris information carried by the system message.

In an embodiment, the base station may obtain ephemeris information of each satellite, and send the system message carrying the ephemeris information of the corresponding satellite to each satellite. Each satellite sends the system message to the terminal after receiving the system message carrying the ephemeris information of each satellite. For example, the satellites include a satellite A, a satellite B, and a satellite C. Ephemeris information corresponding the satellites is a information, b information, and c information, respectively. A system message carrying the a information is a system message A, a system message carrying the b information is a system message B, and a system message carrying the c information is a system message C. Therefore, the base station may send the system message A to the satellite A, send the system message B to the satellite B, and send the system message C to the satellite C. The satellite A sends the system message A to the terminal after receiving the system message A. The satellite B sends the system message B to the terminal after receiving the system message B The satellite C sends the system message C to the terminal after receiving the system message C. In this way, the terminal may determine the primary service satellite based on the received ephemeris information.

In an embodiment, the base station sends indication information to a plurality of satellites. The indication information indicates each satellite to send to the terminal the ephemeris information corresponding to the satellite. For example, the satellites include a satellite A, a satellite B, and a satellite C. Ephemeris information corresponding to the satellites is a information, b information, and c information, respectively. When the base station sends the indication information to the satellite A, the satellite A may send the a information to the terminal. When the base station sends the indication information to the satellite B, the satellite B may send the b information to the terminal. When the base station sends the indication information to the satellite C, the satellite C may send the c information to the terminal. In this way, the terminal may determine the primary service satellite based on the received ephemeris information.

In an embodiment, the base station sends a system message carrying ephemeris information of the plurality of satellites to the terminal through one satellite. After receiving the system message, the terminal determines the primary service satellite based on the ephemeris information carried by the system message.

In an embodiment, the base station sends indication information to one satellite. The indication information indicates the satellite to send to the terminal the ephemeris information corresponding to the plurality of satellites. For example, the satellites include a satellite A, a satellite B, and a satellite C. Ephemeris information corresponding to the satellites is a information, b information, and c information, respectively. When the base station sends the indication information to the satellite A, the satellite A may send the a information, the b information, and the c information to the terminal. In this way, the terminal may determine the primary service satellite based on the received ephemeris information.

In an embodiment, the ephemeris information of different satellites may be pre-stored in the terminal. Therefore, the terminal may determine the primary service satellite based on ephemeris information pre-stored in the terminal.

In an embodiment, in response to an orbit altitude of the satellite being greater than an altitude threshold, it is determined that the satellite is a primary service satellite, and in response to the orbit altitude of the satellite being less than the altitude threshold, it is determined that the satellite is a secondary service satellite. In another embodiment, in response to an operating velocity of the satellite being less than an operating velocity threshold, it is determined that the satellite is the primary service satellite, and in response to the operating velocity of the satellite being greater than the altitude threshold, it is determined that the satellite is the secondary service satellite.

It should be noted that those skilled in the art can understand that the method provided in an embodiment of the present disclosure. The method may be executed independently or together with some methods in the embodiments of the present disclosure or related arts.

Figure 16:
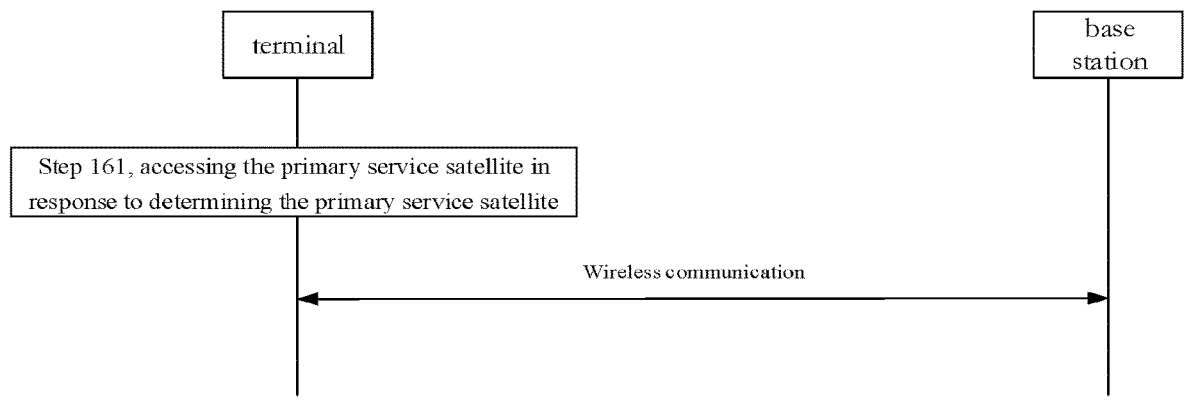
FIG. 16 is a flowchart illustrating a method for wireless communication according to an exemplary embodiment.

As illustrated in FIG. 16, this embodiment provides a method for wireless communication, performed by a terminal. The method includes the following step.

At step 161, the primary service satellite is accessed in response to determining the primary service satellite.

In an embodiment, accessing the primary service satellite may be that the terminal accesses the base station through the primary service satellite based on a random access process.

In an embodiment, the terminal may determine the primary service satellite and the secondary service satellite based on ephemeris information. For example, in response to an orbit altitude of the satellite being greater than an altitude threshold, it is determined that the satellite is a primary service satellite, and in response to the orbit altitude of the satellite being less than the altitude threshold, it is determined that the satellite is a secondary service satellite. In another embodiment, in response to an operating velocity of the satellite being less than an operating velocity threshold, it is determined that the satellite is the primary service satellite, and in response to the operating velocity of the satellite being greater than the altitude threshold, it is determined that the satellite is the secondary service satellite.

In an embodiment, in response to the terminal accessing the primary service satellite, the terminal may perform wireless communication with the base station through the primary service satellite. For example, the terminal may send, through the primary service satellite, to the base station a scheduling request for requesting to schedule the beam of the secondary service satellite to preform wireless communication. Therefore, the base station may schedule the secondary service satellite for the terminal to perform the wireless communication. The terminal simultaneously transmits data on the beam of the primary service satellite and the beam of the secondary service satellite scheduled by the base station.

It should be noted that those skilled in the art can understand that the method provided in an embodiment of the present disclosure. The method may be executed independently or together with some methods in the embodiments of the present disclosure or related arts.

Figure 17:
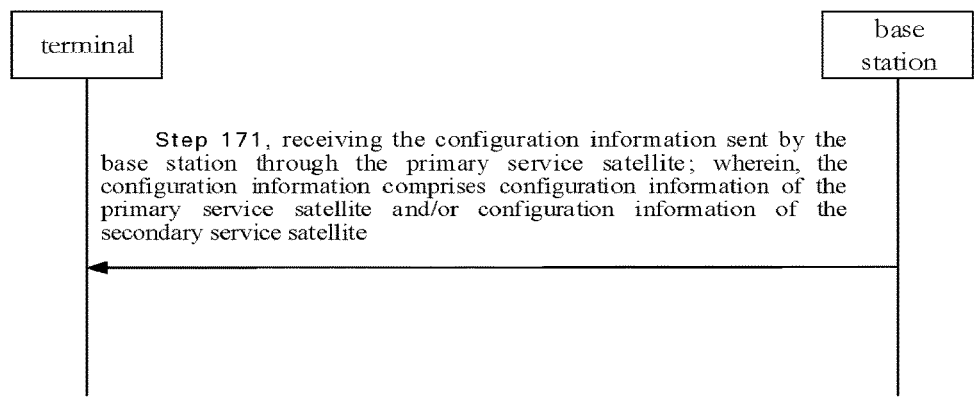
FIG. 17 is a flowchart illustrating a method for wireless communication according to an exemplary embodiment.

As illustrated in FIG. 17, this embodiment provides a method for wireless communication, performed by a terminal. The method includes the following step.

At step 171, the configuration information sent by the base station through the primary service satellite is received.

The configuration information includes configuration information of the primary service satellite and/or configuration information of the secondary service satellite.

In an embodiment, in response to the terminal accessing the primary service satellite, the configuration information sent by the base station through the primary service satellite is received.

In an embodiment, the configuration information includes the configuration information of the primary service satellite and the configuration information of the secondary service satellite.

In an embodiment, the configuration information includes one or more of following information of beam information:
 ID information of the beams;
 frequency point information of the beams;
 bandwidth information of the beams; or
 service time information of the beams.

It should be noted that those skilled in the art can understand that the method provided in an embodiment of the present disclosure. The method may be executed independently or together with some methods in the embodiments of the present disclosure or related arts.

Figure 18:
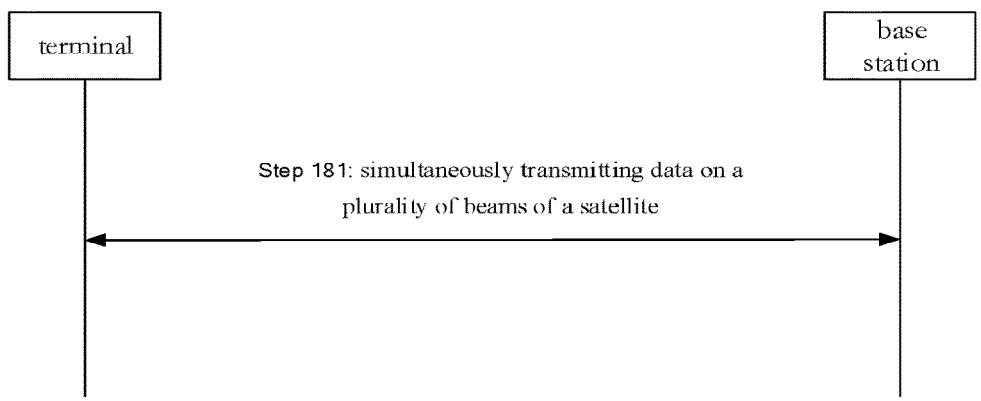
FIG. 18 is a flowchart illustrating a method for wireless communication according to an exemplary embodiment.

As illustrated in FIG. 18, this embodiment provides a method for wireless communication, performed by a base station. The method includes the following step.

At step 181, the data is simultaneously transmitted on a plurality of beams of one satellite; or the data is simultaneously transmitted on a plurality of beams of a plurality of satellites.

The satellite may be a flying base station or a flight device for transmitting data between a terminal and a base station. The base station may be an interface device for terminal access to the network. Herein, the base stations may be various types of base stations, such as a base station of the third generation mobile communication (3G) network, a base station of the fourth generation mobile communication (4G) network, a base station of the fifth generation mobile communication (5G) network, or other evolutionary base stations. Herein, the satellite may be a low earth orbiting (LEO) satellite. It should be noted that with the evolution of satellite wireless communication networks, the satellite may also be a medium earth orbiting (MEO) satellite or a geostationary earth orbiting (GEO) satellite.

In an embodiment, the satellite may be deployed in an airspace with a density of terrestrial base stations is less than a density threshold, and a channel quality in a wireless communication environment is less than a quality threshold, for example, an airspace where a remote mountain region and/or an ocean is located.

This terminal may be, but is not limited to, a mobile phone, a wearable device, a vehicle mounted terminal, a road side unit (RSU), a smart home terminal, an industrial sensing device, and/or a medical device, etc.

In an embodiment, the data is simultaneously transmitted on a plurality of beams of one satellite or on a plurality of beams of a plurality of satellites.

In an embodiment, the data is simultaneously transmitted on the plurality of beams of the same satellite. Herein, simultaneously transmitting the data may be simultaneously receiving or sending the data. In this way, a speed of transmitting data between the terminal and the base station may be improved.

In an embodiment, please referring to FIG. 3 again, one satellite may send or receive the data on the plurality of beams. For example, one satellite may send or receive the data on three beams, namely a beam 1, a beam 2, and a beam 3. Herein, different beams have different signal coverage ranges and/or service times. For example, a signal coverage range of the beam 1 is greater than a signal coverage range of each of the beam 2 and the beam 3. For example, a service duration of the beam 2 is greater than a service duration of each of the beam 1 and the beam 3, i.e. t2>t1>t3. Herein, each beam of the plurality of beams may provide a service to a terminal within the signal coverage range of that beam. Herein, the plurality of beams may simultaneously provide a service to the terminal in a region simultaneously covered by signals of the plurality of beams.

In an embodiment, the data is transmitted simultaneously on the plurality of beams of different satellites. Herein, simultaneously transmitting the data may be simultaneously receiving or sending the data. In this way, the speed for transmitting the data between the terminal and the base station may be improved.

In an embodiment, please referring to FIG. 4 again, the plurality of beams may be working beams of the plurality of satellites. For example, beams of a satellite 1 are a beam 1 and a beam 2, and a beam of a satellite 2 is a beam 3. Herein, different satellites have different orbit altitudes and/or operating velocities relative to a ground. For example, an orbit altitude of the satellite 1 is greater than an orbit altitude of the satellite 2, or an operating velocity of the satellite 1 is lower than an operating velocity of the satellite 2. Herein, beams of different satellites have different signal coverage ranges and/or service times. For example, a signal coverage range of the beam 1 is greater than a signal coverage range of the beam 3. For another example, a service duration of the beam 1 is greater than a service duration of the beam 3, i.e., t1>t3. Herein, each beam of different satellites may provide a service for a terminal within a signal coverage range of that beam. Herein, beams of different satellites may simultaneously provide a service to a terminal in a region simultaneously covered by signals of the beams of those different satellites.

In an embodiment, the base station may send configuration information of the plurality of beams to the terminal, and simultaneously transmit the data on the plurality of beams indicated by the configuration information. Herein, simultaneously transmitting the data may be simultaneously receiving or sending the data.

In an embodiment, the satellite may send the configuration information to the terminal by means of a unicast mode. In another embodiment, the satellite may send the configuration information to the terminal by means of broadcasting.

In an embodiment, the configuration information may be sent to the terminal when the terminal is in a radio resource control (RRC) connected state or in a RRC non-connected state. For terminals in the RRC connected state, the satellite may send the configuration information to each terminal through a system message, a RRC signaling, or a downlink control information (DCI) signaling. For terminals in the RRC non-connected state, the satellite may send the configuration information to each terminal through the system message. In this way, multiplexing of the RRC signaling, the system message, or the downlink control information is achieved, compatibility of signaling is improved.

In an embodiment, the configuration information includes one or more of following information of beam information:
 identifier (ID) information of the beams;
 frequency point information of the beams;
 bandwidth information of the beams; or
 service time information of the beams.

In an embodiment, the data may be transmitted simultaneously on the plurality of beams indicated by the ID information of the beams in the configuration information.

Herein, a beam indicated by the ID information of the beam may be a beam scheduled for performing data transmission by the terminal. Alternatively, the beam indicated by the ID information of the beam may be a beam selected by the terminal for data transmission. Herein, it should be noted that after the terminal selects the beam, the beam is still required to be uniformly scheduled by the base station for data transmission. In an embodiment, the terminal may send a scheduling request carrying a selected beam to the base station, and the base station may determine a beam for the terminal the perform data transmission based on the scheduling request.

In an embodiment, frequency points of different beams may be the same or different.

In an embodiment, bandwidths of different beams may be the same or different.

In an embodiment, the service time information of the beam may include information of time points. For example, the service time information includes information of a time point 1 and a time point 2, that is, the service time information indicates a duration between the time point 1 and the time point 2. In another embodiment, the service time of the beam may also include information of a time point and information of a duration. For example, the service time information includes a time point 1 and a duration 1, that is, the service time information indicates a time period corresponding to the time point 1 and the duration 1.

In an embodiment, the service time information is determined based on the orbit altitude and/or the operating velocity of the satellite relative to the ground. In an embodiment, in response to the orbit altitude of the satellite relative to the ground being greater than an altitude threshold, it is determined that the duration indicated by the service time information is greater than a duration threshold, and in response to the orbit altitude of the satellite relative to the ground being less than the altitude threshold, it is determined that the duration indicated by the service time information is less than the duration threshold. In another embodiment, in response to the operating velocity of the satellite relative to the ground being greater than an operating velocity threshold, it is determined that the duration indicated by the service time information is less than the duration threshold, and in response to the operating velocity of the satellite relative to the ground being less than the operating velocity threshold, it is determined that the duration indicated by the service time information is greater than the duration threshold.

In an embodiment, the beam information in the configuration information may include different types of beam information. For example, the beam information may include beam information of a primary beam and beam information of a secondary beam. Herein, a coverage range of the primary beam is greater than a coverage range of the secondary beam, and/or a service duration of the primary beam is greater than a coverage range of the secondary beam. Herein, beams indicated by different types of beam information may use a same frequency domain resource or different frequency domain resources.

In an embodiment, please referring to FIG. 5, the satellite sends the configuration information including the beam information to the terminal. The beam information includes the beam information of the primary beam and the beam information of the secondary beam. The base station simultaneously transmits data on the primary beam and the secondary beam of the satellite. In this way, the speed of data transmission between the terminal and the base station may be improved. Herein, it should be noted that a plurality of secondary beams may be provided. The base station may select any number of secondary beams from the plurality of secondary beams for the terminal to perform data transmission.

In an embodiment, please referring to FIG. 6, the beam of the satellite 1 is the beam 1, and the beam of the satellite 2 is the beam 2. The base station may communicate with the terminal through the beam 1 of the satellite 1 and the beam 2 of the satellite 2. In an embodiment, the base station simultaneously transmits the data on the beam 1 of the satellite 1 and the beam 2 of the satellite 2. In this way, the transmission speed of data transmission between the terminal and the base station may be improved.

In an embodiment, the base station may determine a primary service satellite and a secondary service satellite based on ephemeris information. In an embodiment, the ephemeris information includes information about the orbit altitude. In response to the orbit altitude of the satellite being greater than the altitude threshold, it is determined that the satellite is the primary service satellite, and in response to the orbit altitude of the satellite being less than the altitude threshold, it is determined that the satellite is the secondary service satellite. In an embodiment, the base station simultaneously transmits the data on a beam of the primary service satellite and a beam of the secondary service satellite. In this way, the transmission speed of data transmission between the terminal and the base station may be improved. Herein, it should be noted that a plurality of secondary service satellites are provided. The base station may select any number of secondary service satellites from the plurality of secondary service satellites for terminal to preform data transmission.

In an embodiment, in response to a transmission speed to be transmitted data by the terminal being greater than a speed threshold, the terminal sends a request message for acquiring the configuration information to the base station. After receiving the configuration information sent by the base station based on the request message, the terminal may simultaneously transmit the data on the plurality of beams indicated by the configuration information.

In an embodiment, in response to establishing a RRC connection between the terminal and the base station, the terminal sends the request message for acquiring the configuration information to the base station. After receiving the configuration information sent by the base station based on the request message, the terminal may simultaneously transmit the data on the plurality of beams indicated by the configuration information.

It should be noted that those skilled in the art can understand that the method provided in an embodiment of the present disclosure. The method may be executed independently or together with some methods in the embodiments of the present disclosure or related arts.

Figure 19:
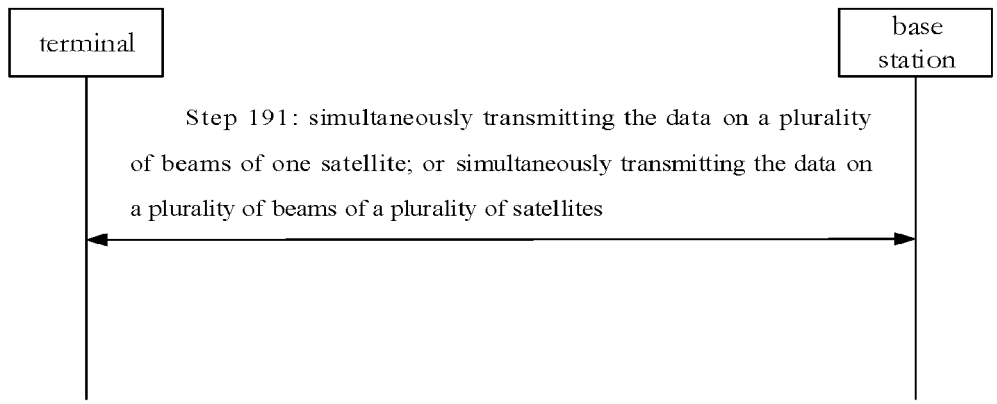
FIG. 19 is a flowchart illustrating a method for wireless communication according to an exemplary embodiment.

As illustrated in FIG. 19, this embodiment provides a method for wireless communication, performed by a base station. The method includes the following step.

At step 191, the data is simultaneously transmitted on a plurality of beams of one satellite; or the data is simultaneously transmitted on a plurality of beams of a plurality of satellites.

In an embodiment, the base station configuration information to a terminal. The base station simultaneously transmits the data of the base station on the plurality of beams of one satellite indicated by the configuration information. Herein, the data may be transmitted simultaneously on one primary beam and at least one secondary beam of one satellite indicated by the configuration information. Herein, the beam information in the configuration information may include different types of beam information. For example, the beam information may include beam information of the primary beam and beam information of the secondary beam. Herein, a coverage range of the primary beam is greater than a coverage range of the secondary beam, and/or a service duration of the primary beam is greater than a service duration of the secondary beam. Herein, beams indicated by different types of beam information may use a same frequency domain resource or different frequency domain resources.

In an embodiment, a primary service satellite and a secondary service satellite are determined based on ephemeris information. The data is simultaneously transmitted on a beam of the primary service satellite and a beam of the secondary service satellite. Herein, the data of the base station may be simultaneously transmitted on the beam of one primary service satellite and the beam of at least one secondary service satellite. Herein, in response to an orbit altitude of the satellite being greater than an altitude threshold, it is determined that the satellite is the primary service satellite, and in response to the orbit altitude of the satellite being less than the altitude threshold, it is determined that the satellite is the secondary service satellite. Here, the beams of different satellites may use a same frequency domain resource or different frequency domain resources.

It should be noted that those skilled in the art can understand that the method provided in an embodiment of the present disclosure. The method may be executed independently or together with some methods in the embodiments of the present disclosure or related arts.

Figure 20:
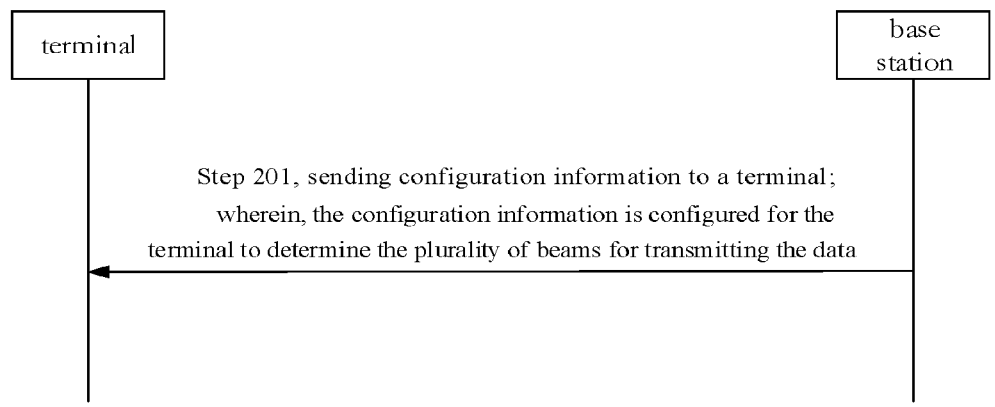
FIG. 20 is a flowchart illustrating a method for wireless communication according to an exemplary embodiment.

As illustrated in FIG. 20, this embodiment provides a method for wireless communication, performed by a base station. The method includes the following step.

At step 201, configuration information is sent to a terminal.

The configuration information is configured for the terminal to determine the plurality of beams for transmitting the data.

In an embodiment, the configuration information includes one or more of following information of beam information:
 identifier (ID) information of the beams;
 frequency point information of the beams;
 bandwidth information of the beams; or
 service time information of the beams.

In an embodiment, in response to a transmission speed to be transmitted data by the terminal being greater than a speed threshold, the terminal sends a request message for acquiring the configuration information to the base station. After receiving the configuration information sent by the base station based on the request message, the data is transmitted simultaneously on the plurality of beams indicated by the configuration information.

In an embodiment, in response to establishing a RRC connection between the terminal and the base station, the terminal sends the request message for acquiring the configuration information to the base station. After receiving the configuration information sent by the base station based on the request message, the data is transmitted simultaneously on the plurality of beams indicated by the configuration information.

In an embodiment, the beam information includes information of a first beam, and information of a second beam in which a coverage range of the first beam is greater than a coverage range of the second beam, and/or a service duration of the first beam is greater than a service duration of the second beam. Herein, the first beam may be a primary beam, and the second beam may be a secondary beam. Herein, the first beam and the second beam may use a same frequency domain resource or different frequency domain resources.

In an embodiment, one satellite sends the configuration information to the terminal. The beam information in the configuration information includes the information of the first beam and the information of the second beam. The base station simultaneously transmits the data on the first beam and the second beam of one satellite. In this way, transmission rate of data transmission between the terminal and the base station may be improved. Herein, it should be noted that a plurality of second beams are provided. The base station may select any number of second beams from the plurality of second beams for the terminal the transmit data.

It should be noted that those skilled in the art can understand that the method provided in an embodiment of the present disclosure. The method may be executed independently or together with some methods in the embodiments of the present disclosure or related arts.

Figure 21:
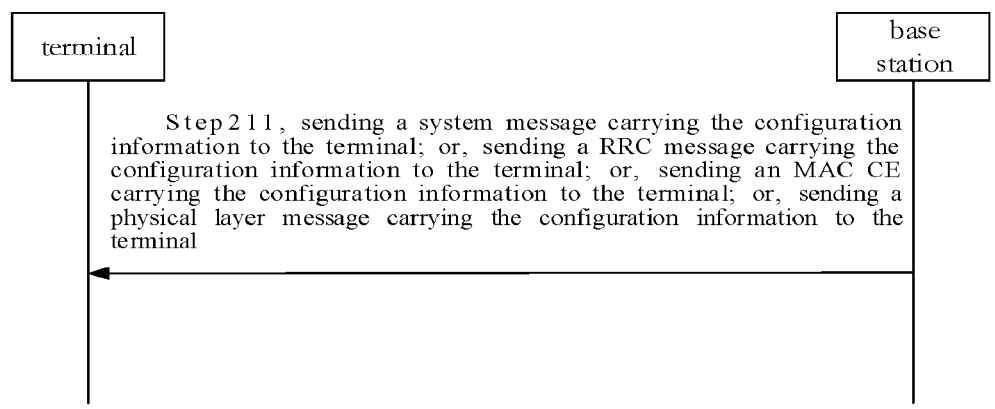
FIG. 21 is a flowchart illustrating a method for wireless communication according to an exemplary embodiment.

As illustrated in FIG. 21, this embodiment provides a method for wireless communication, performed by a base station. The method includes the following step.

At step 211, a system message carrying the configuration information is sent to the terminal; or, a RRC message carrying the configuration information is sent to the terminal; or, an MAC CE carrying the configuration information is sent to the terminal; or, a physical layer message carrying the configuration information is sent to the terminal.

In an embodiment, the base station sends the system message carrying the configuration information to the terminal, and the data is simultaneously transmitted on a plurality of beams indicated by the configuration information.

In an embodiment, the base station sends the RRC message carrying the configuration information to the terminal, and the data is simultaneously transmitted on a plurality of beams indicated by the configuration information.

In an embodiment, the base station sends the MAC CE carrying the configuration information to the terminal, and the data is simultaneously transmitted on a plurality of beams indicated by the configuration information.

In an embodiment, the base station sends the physical layer message carrying the configuration information to the terminal, and the data is simultaneously transmitted on a plurality of beams indicated by the configuration information.

In this way, multiplexing of the RRC message, the system message, the MAC CE, and the physical layer message is achieved, compatibility of signaling is improved.

It should be noted that those skilled in the art can understand that the method provided in an embodiment of the present disclosure. The method may be executed independently or together with some methods in the embodiments of the present disclosure or related arts.

Figure 22:
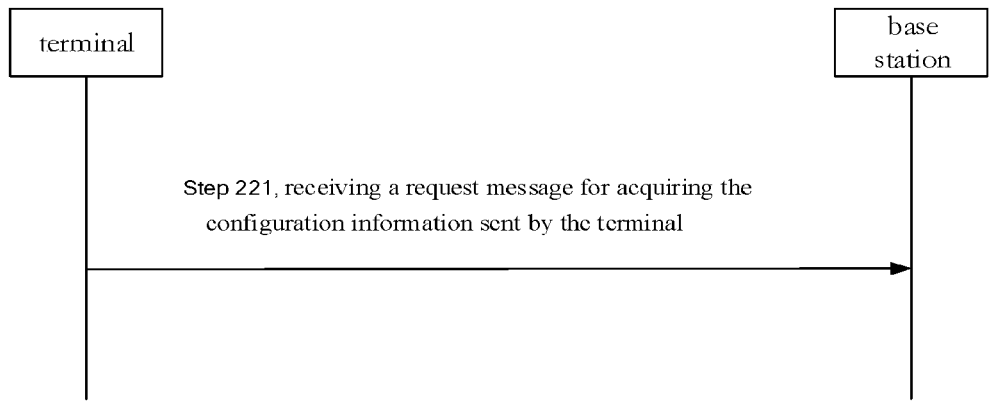
FIG. 22 is a flowchart illustrating a method for wireless communication according to an exemplary embodiment.

As illustrated in FIG. 22, this embodiment provides a method for wireless communication, performed by a base station. The method includes the following step.

At step 221, a request message for acquiring the configuration information sent by the terminal is received.

In an embodiment, the terminal sends the request message for acquiring the configuration information to the base station in response to a demand of initiating a service with a data transmission speed greater than a speed threshold.

In an embodiment, the speed threshold is sent to the terminal.

In an embodiment, the speed threshold is determined based on a channel environment where the data is transmitted between the terminal and the base station. In an embodiment, in response to a channel quality of data transmission between the terminal and the base station being greater than a quality threshold, it is determined that the speed threshold is greater than a predetermined value. In response to the channel quality of data transmission between the terminal and the base station being less than the quality threshold, it is determined that the speed threshold is less than the predetermined value. In this way, the speed threshold may be adapted to the channel environment.

It should be noted that those skilled in the art can understand that the method provided in an embodiment of the present disclosure. The method may be executed independently or together with some methods in the embodiments of the present disclosure or related arts.

Figure 23:
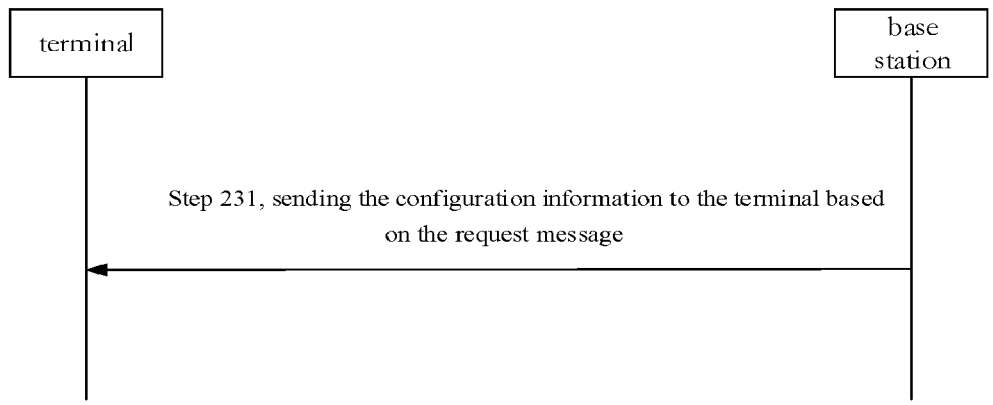
FIG. 23 is a flowchart illustrating a method for wireless communication according to an exemplary embodiment.

As illustrated in FIG. 23, this embodiment provides a method for wireless communication, performed by a base station. The method includes the following step.

At step 231, the configuration information is sent to the terminal based on the request message.

In an embodiment, the request message may carry identifier information of a satellite, and the base station sends the configuration information of the satellite corresponding to the identifier information to the terminal based on the request message.

For example, the request message may carry an identifier information A of a satellite A, an identifier information B of a satellite B, and an identifier information C of a satellite C, then the base station may send configuration information of the satellite A, the satellite B, and the satellite C to the terminal after receiving the request message.

In an embodiment, the configuration information includes one or more of following information of beam information:
ID information of the beams;
frequency point information of the beams;
bandwidth information of the beams; or
service time information of the beams.

It should be noted that those skilled in the art can understand that the method provided in an embodiment of the present disclosure. The method may be executed independently or together with some methods in the embodiments of the present disclosure or related arts.

Figure 24:
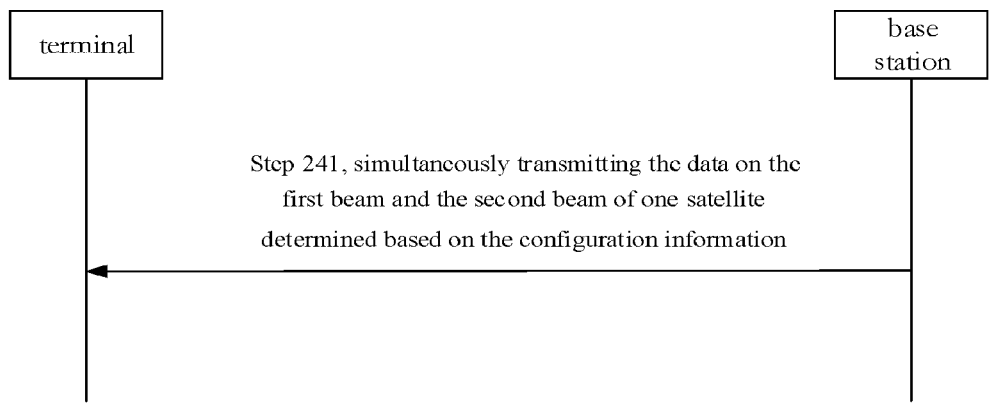
FIG. 24 is a flowchart illustrating a method for wireless communication according to an exemplary embodiment.

As illustrated in FIG. 24, this embodiment provides a method for wireless communication, performed by a base station. The method includes the following step.

At step 241, the data is simultaneously transmitted on the first beam and the second beam of one satellite determined based on the configuration information.

In an embodiment, a coverage range of the first beam is greater than a coverage range of the second beam, and/or a service duration of the first beam is greater than a service duration of the second beam. Herein, the first beam may be a primary beam, and the second beam may be a secondary beam. Herein, the first beam and the second beam may use a same frequency domain resource or different frequency domain resources.

In an embodiment, one satellite sends the configuration information to the terminal. The configuration information includes the information of the first beam and the information of the second beam. The base station simultaneously transmits the data on the first beam and the second beam of one satellite. In this way, transmission rate of data transmission between the terminal and the base station may be improved. Herein, it should be noted that a plurality of second beams are provided. The base station may select any number of second beams from the plurality of second beams for the terminal the transmit data.

It should be noted that those skilled in the art can understand that the method provided in an embodiment of the present disclosure. The method may be executed independently or together with some methods in the embodiments of the present disclosure or related arts.

Figure 25:
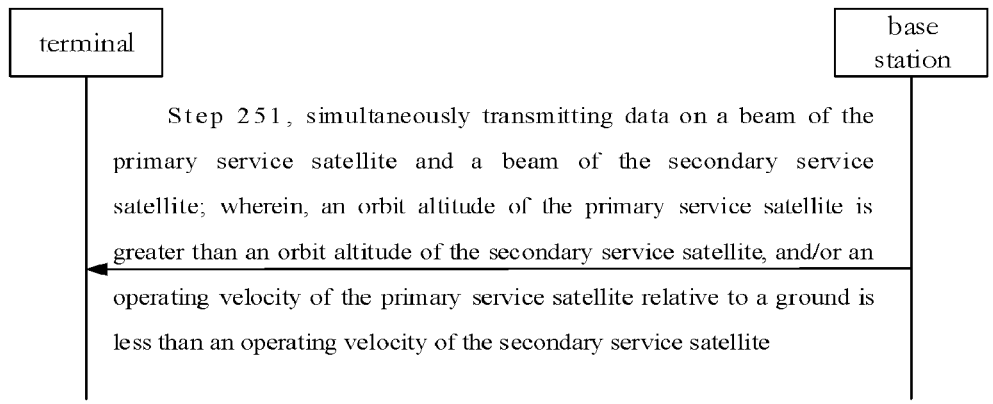
FIG. 25 is a flowchart illustrating a method for wireless communication according to an exemplary embodiment.

As illustrated in FIG. 25, this embodiment provides a method for wireless communication, performed by a base station. The method includes the following step.

At step 251, data is simultaneously transmitted on a beam of the primary service satellite and a beam of the secondary service satellite.

An orbit altitude of the primary service satellite is greater than an orbit altitude of the secondary service satellite, and/or an operating velocity of the primary service satellite relative to a ground is less than an operating velocity of the secondary service satellite.

In an embodiment, the terminal may determine a primary service satellite and a secondary service satellite based on ephemeris information. For example, in response to the orbit altitude of the satellite being greater than the altitude threshold, it is determined that the satellite is the primary service satellite, and in response to the orbit altitude of the satellite being less than the altitude threshold, it is determined that the satellite is the secondary service satellite. In an embodiment, the terminal simultaneously transmits the data on a beam of the primary service satellite and a beam of the secondary service satellite. In this way, the speed of data transmission between the terminal and the base station may be improved. Herein, it should be noted that a plurality of secondary service satellites are provided. The base station may select any number of secondary service satellites from the plurality of secondary service satellites for terminal to preform data transmission.

It should be noted that those skilled in the art can understand that the method provided in an embodiment of the present disclosure. The method may be executed independently or together with some methods in the embodiments of the present disclosure or related arts.

Figure 26:
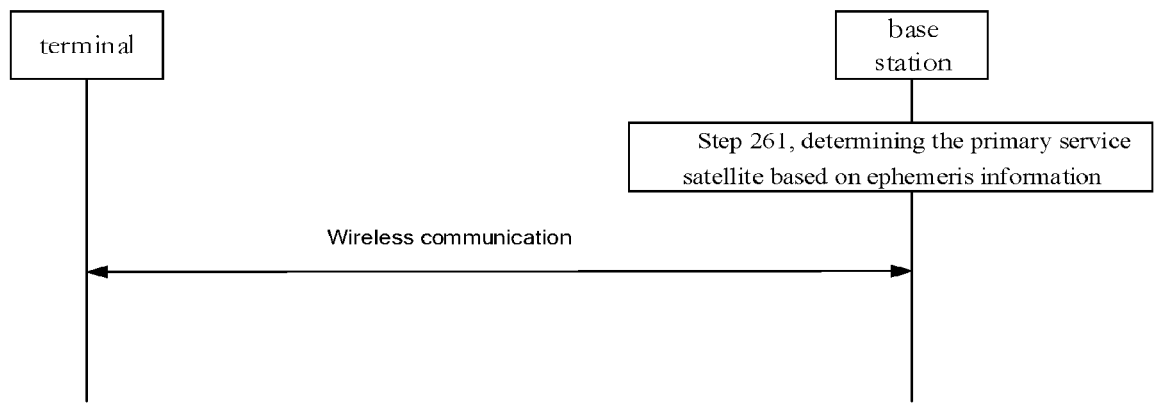
FIG. 26 is a flowchart illustrating a method for wireless communication according to an exemplary embodiment.

As illustrated in FIG. 26, this embodiment provides a method for wireless communication, performed by a base station. The method includes the following step.

At step 261, the primary service satellite is determined based on ephemeris information.

In an embodiment, the ephemeris information may include operating velocity information of the satellite, orbit altitude information of the satellite, and operating trajectory information of the satellite.

In an embodiment, in response to an orbit altitude of the satellite being greater than an altitude threshold, it is determined that the satellite is a primary service satellite, and in response to the orbit altitude of the satellite being less than the altitude threshold, it is determined that the satellite is a secondary service satellite. In another embodiment, in response to an operating velocity of the satellite being less than an operating velocity threshold, it is determined that the satellite is the primary service satellite, and in response to the operating velocity of the satellite being greater than the altitude threshold, it is determined that the satellite is the secondary service satellite.

It should be noted that those skilled in the art can understand that the method provided in an embodiment of the present disclosure. The method may be executed independently or together with some methods in the embodiments of the present disclosure or related arts.

Figure 27:
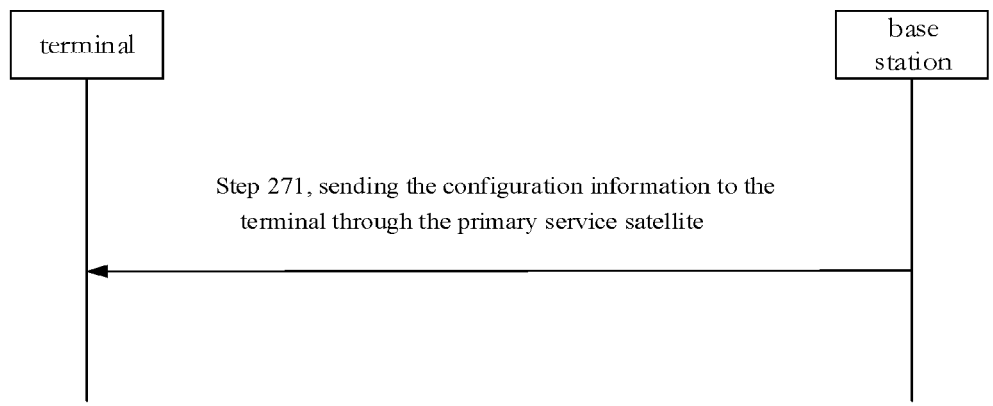
FIG. 27 is a flowchart illustrating a method for wireless communication according to an exemplary embodiment.

As illustrated in FIG. 27, this embodiment provides a method for wireless communication, performed by a base station. The method includes the following step.

At step 271, the primary service satellite sends the configuration information to the terminal.

The configuration information comprises configuration information of the primary service satellite and/or configuration information of the secondary service satellite.

n an embodiment, in response to the terminal accessing the primary service satellite, the base station sends the configuration information to the terminal through the primary service satellite.

In an embodiment, the configuration information includes the configuration information of the primary service satellite and the configuration information of the secondary service satellite.

In an embodiment, the configuration information includes one or more of following information of beam information:
ID information of the beams;
frequency point information of the beams;
bandwidth information of the beams; or
service time information of the beams.

It should be noted that those skilled in the art can understand that the method provided in an embodiment of the present disclosure. The method may be executed independently or together with some methods in the embodiments of the present disclosure or related arts.

Figure 28:
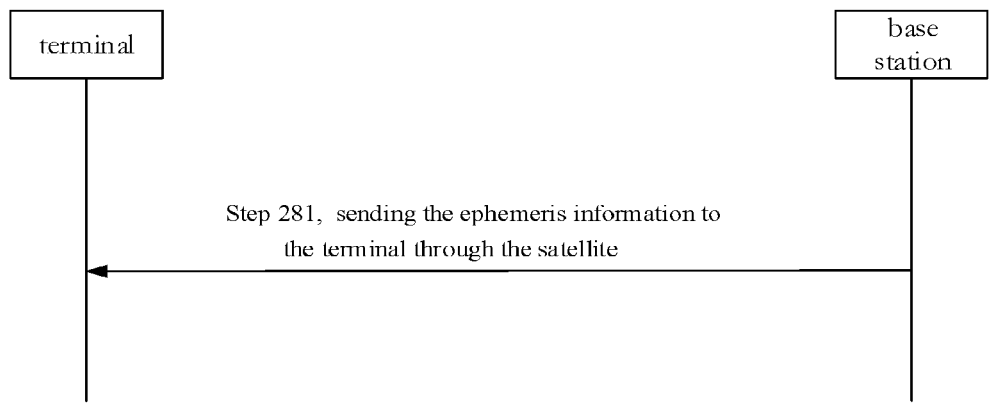
FIG. 28 is a flowchart illustrating a method for wireless communication according to an exemplary embodiment.

As illustrated in FIG. 28, this embodiment provides a method for wireless communication, performed by a base station. The method includes the following step.

At step 281, the ephemeris information is sent to the terminal through the satellite.

In an embodiment, the base station may obtain ephemeris information of each satellite, and send the system message carrying the ephemeris information of the corresponding satellite to each satellite. Each satellite sends the system message to the terminal after receiving the system message carrying the ephemeris information of each satellite. For example, the satellites include a satellite A, a satellite B, and a satellite C. Ephemeris information corresponding the satellites is a information, b information, and c information, respectively. A system message carrying the a information is a system message A, a system message carrying the b information is a system message B, and a system message carrying the c information is a system message C. Therefore, the base station may send the system message A to the satellite A, send the system message B to the satellite B, and send the system message C to the satellite C. The satellite A sends the system message A to the terminal after receiving the system message A. The satellite B sends the system message B to the terminal after receiving the system message B The satellite C sends the system message C to the terminal after receiving the system message C. In this way, the terminal may determine the primary service satellite based on the received ephemeris information.

In an embodiment, the base station sends indication information to the satellite. The indication information indicates the satellite to send to the terminal the ephemeris information corresponding to the satellite. For example, the satellites include a satellite A, a satellite B, and a satellite C. Ephemeris information corresponding to the satellites is a information, b information, and c information, respectively. When the base station sends the indication information to the satellite A, the satellite A may send the a information to the terminal. When the base station sends the indication information to the satellite B, the satellite B may send the b information to the terminal. When the base station sends the indication information to the satellite C, the satellite C may send the c information to the terminal. In this way, the terminal may determine the primary service satellite based on the received ephemeris information.

In an embodiment, the base station sends indication information to one satellite. The indication information indicates the satellite to send to the terminal the ephemeris information corresponding to the plurality of satellites. For example, the satellites include a satellite A, a satellite B, and a satellite C. Ephemeris information corresponding to the satellites is a information, b information, and c information, respectively. When the base station sends the indication information to the satellite A, the satellite A may send the a information, the b information, and the c information to the terminal. In this way, the terminal may determine the primary service satellite based on the received ephemeris information.

It should be noted that those skilled in the art can understand that the method provided in an embodiment of the present disclosure. The method may be executed independently or together with some methods in the embodiments of the present disclosure or related arts.

Figure 29:
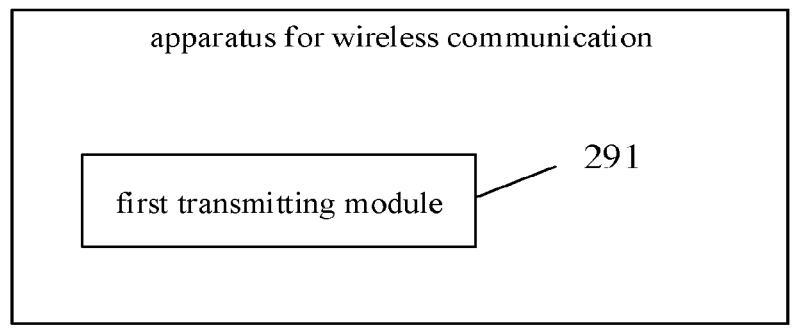
FIG. 29 is a block diagram illustrating an apparatus for wireless communication according to an exemplary embodiment.

As illustrated in FIG. 29, this embodiment provides an apparatus for wireless communication, performed by a terminal. The apparatus includes a first transmitting module 291.

The first transmitting module 291 is configured to simultaneously transmit data on a plurality of beams of a satellite.

It should be noted that those skilled in the art can understand that the method provided in an embodiment of the present disclosure. The method may be executed independently or together with some methods in the embodiments of the present disclosure or related arts.

Figure 30:
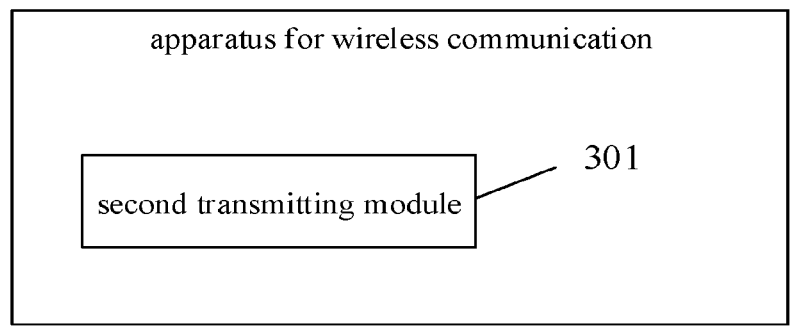
FIG. 30 is a block diagram illustrating an apparatus for wireless communication according to an exemplary embodiment.

As illustrated in FIG. 30, this embodiment provides an apparatus for wireless communication, performed by a base station. The apparatus includes a second transmitting module 301.

The second transmitting module 301 is configured to simultaneously transmit data on a plurality of beams of a satellite.

Regarding the apparatus in the above embodiment, the specific manners in which each module performs operations have been described in detail in the embodiments related to the method, and will not be explained in detail herein.

Embodiments of the present disclosure provide a communication device. The communication device includes a processor and a memory configured to store instructions executable by the processor. The processor is configured to implement the method in any embodiment of the present disclosure when running the executable instructions.

The processor may include various types of storage media. The storage media may be a non-transitory computer storage media capable of continuing to remember and store information on the storage media after power failure of the communication device.

The processor may be connected to the memory through a bus or other means, and configured to read executable programs stored on the memory.

Embodiments of the present disclosure provide a computer storage medium having computer executable instructions stored thereon. The executable instructions are caused to implement the method as described in any embodiment of the present disclosure when executed by a processor.

Regarding the apparatus in the above embodiment, the specific manners in which each module performs operations have been described in detail in the embodiments related to the method, and will not be explained in detail herein.

Figure 31:
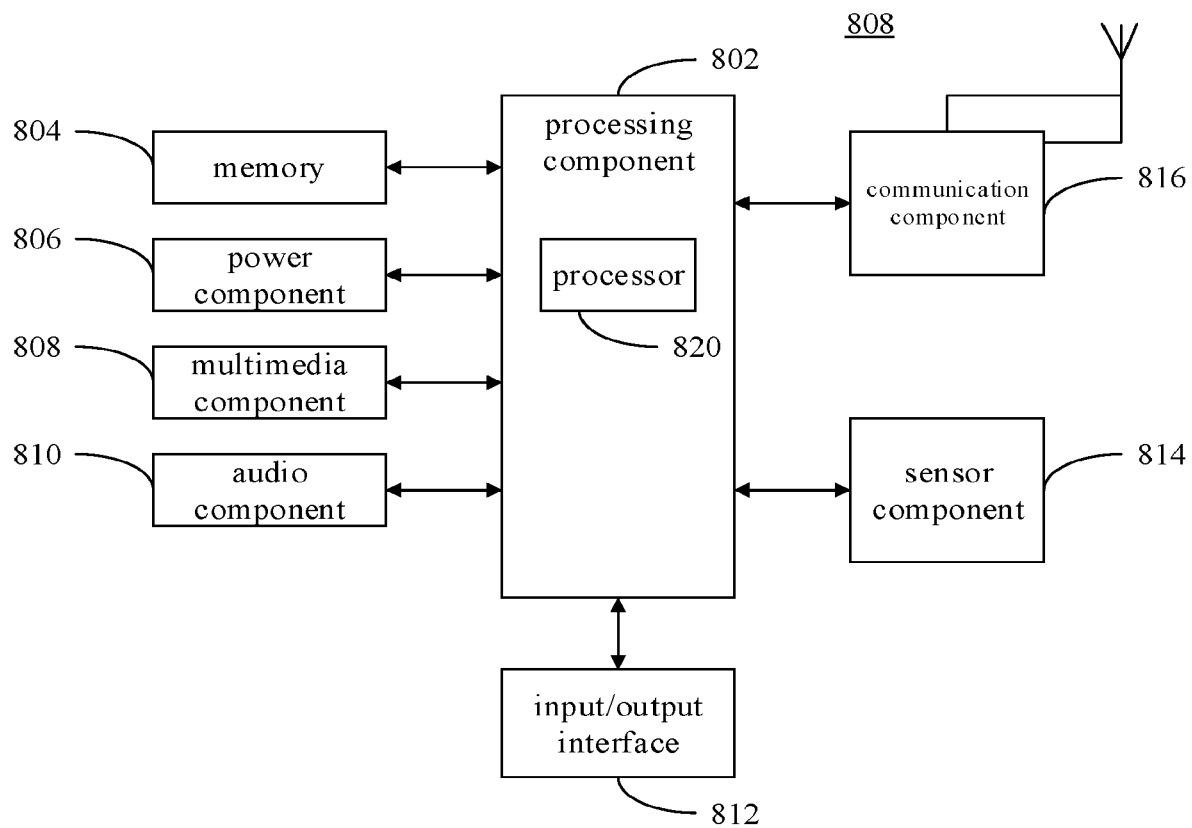
FIG. 31 is a schematic diagram illustrating a structure of a terminal according to an exemplary embodiment.

As illustrated in FIG. 31, embodiments of the present disclosure provide a structure of a terminal.

Referring to FIG. 31, this embodiment provides a terminal 800. The terminal 800 may be, specifically, a mobile phone, a computer, a digital broadcasting terminal, a message transceiving equipment, a game console, a tablet equipment, a medical equipment, a fitness equipment, or a personal digital assistant.

As illustrated in FIG. 31, the terminal 800 may include one or more of: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 for executing instructions to implement all or a part of the above method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the terminal 800. Examples of such data include instructions for any application or method operated on the terminal 800 for performing contraction data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 806 is configured to provide power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 808 includes a front camera and/or a rear camera. When the terminal 800 is in an operation mode, such as a shooting mode or a video mode, the front camera and/or the rear camera may receive external multimedia data. Each front camera and rear camera may be a fixed optical lens system or have a focal length and an optical zoom capability.

The audio component 810 is configured to output and/or input an audio signal. For example, the audio component 810 includes a microphone ("MIC") for receiving an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting the audio signal.

The I/O interface 812 is configured to provide an interface between the processing component 802 and peripheral interface modules, such as a keyboard, a click wheel, buttons, and the like. These buttons may include, but be not limited to, a home button, a volume button, a start button, and a lock button.

The sensor component 814 includes one or more sensors for providing status assessments of various aspects of the terminal 800. For example, the sensor component 814 may detect an open/closed state of the terminal 800, relative positioning of components, e.g., the display and the keypad of the terminal 800, a position change of the terminal 800 or a component of the terminal 800, a presence or absence of user contraction with the terminal 800, an orientation or an acceleration/deceleration of the terminal 800, and a temperature change of the terminal 800. The sensor component 814 may include a proximity sensor configured to detect the presence of nearby objects without any physical contact. The sensor component 814 may also include an optical sensor, such as a CMOS or CCD image sensor, for use in an imaging application. In some embodiments, the sensor component 214 may also include an acceleration sensor, a gyro sensor, a magnetic sensor, a pressure sensor or a temperature sensor.

The communication component 816 is configured to facilitate communication, wired or wirelessly, between the terminal 800 and other devices. The terminal 800 may access a wireless network based on any communication standard, such as Wi-Fi, 2G, 3G, or a combination thereof. In an embodiment, the communication component 216 receives a broadcast signal or broadcast associated information from an external broadcast management system via a broadcast channel. In an embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an embodiment, there is also provided a non-transitory computer readable storage medium including instructions, such as the memory 804 including the instructions. The instructions may be executed by the processor 820 in the terminal 800 for performing the above method. For example, the non-transitory computer readable storage medium may be a ROM, a RAM, a CD-ROM, a magnetic tape, a floppy disc, an optical data storage device, and the like.

Figure 32:
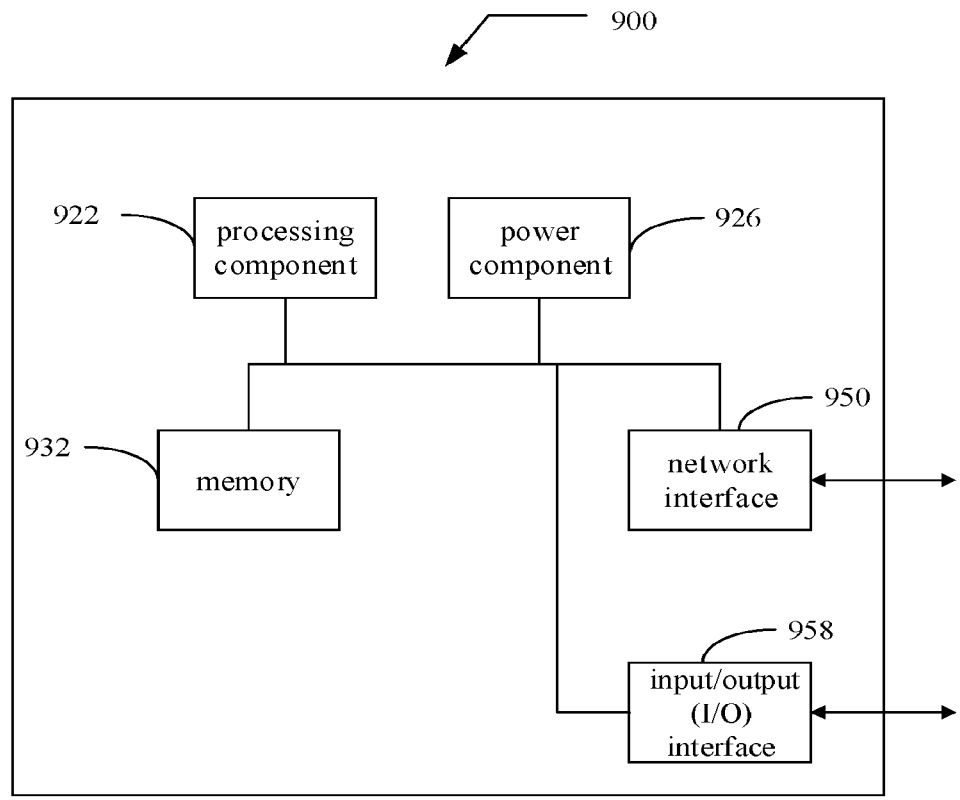
FIG. 32 is a block diagram illustrating a base station according to an exemplary embodiment.

As illustrated in FIG. 32, an embodiment of the present disclosure provides a structure of a base station. For example, the base station 900 may be provided as a network device. Referring to FIG. 32, the base station 900 includes a processing component 922, which further include one or more processors, and memory resources represented by the memory 932, which are configured to store instructions executed by the processing component 922, for example, an application. The applications stored in the memory 932 may include one or more modules each of which corresponds to a set of instructions. In addition, the processing component 922 is configured to execute instructions, to execute any of the above methods applied to the base station.

The base station 900 may further include one power supply component 926 configured to execute power management of the base station 900, and one wired or wireless network interface 950 configured to connect the base station 900 to a network, and one input/output(I/O) interface 958. The base station 900 may operate an operating system stored in the memory 932, for example, Windows Server™, Mac OS X™, Unix™, Linux™, FreeBSD™, or the like.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

The invention claimed is:

1. A method for wireless communication, performed by a terminal, comprising:
simultaneously transmitting data on a plurality of beams of a satellite,
wherein simultaneously transmitting the data on the plurality of beams of the satellite comprises:
simultaneously transmitting the data on a plurality of beams of one satellite;
simultaneously transmitting the data on a plurality of beams of a plurality of satellites;
wherein the satellite comprises a primary service satellite and a secondary service satellite, and
simultaneously transmitting the data on the plurality of beams of the plurality of satellites comprises:
simultaneously transmitting data on a beam of the primary service satellite and
a beam of the secondary service satellite; and
wherein, an orbit altitude of the primary service satellite is greater than an orbit altitude of the secondary service satellite, and
an operating velocity of the primary service satellite relative to a ground is less than an operating velocity of the secondary service satellite.

2. The method according to claim 1, further comprising:
receiving configuration information sent by a base station;
wherein, the configuration information is configured for the terminal to determine the plurality of beams for transmitting the data.

3. The method according to claim 2, wherein receiving the configuration information sent by the base station comprises:
receiving a system message carrying the configuration information sent by the base station;
or,
receiving a radio resource control (RRC) message carrying the configuration information sent by the base station;
or,
receiving a media access control (MAC) control element (CE) carrying the configuration information sent by the base station;
or,
receiving a physical layer message carrying the configuration information sent by the base station.

4. The method according to claim 2, further comprising:
sending a request message for acquiring the configuration information to the base station in response to a demand of initiating a service with a data transmission speed greater than a speed threshold;
wherein receiving the configuration information sent by the base station comprises:
receiving the configuration information sent by the base station based on the request message.

5. The method according to claim 1, wherein simultaneously transmitting the data on the plurality of beams of one satellite comprises:
simultaneously transmitting the data on the first beam and the second beam of one satellite determined based on the configuration information.

6. The method according to claim 1, further comprising:
determining the primary service satellite based on ephemeris information.

7. The method according to claim 6, wherein determining the primary service satellite based on the ephemeris information comprises:
determining the primary service satellite based on received ephemeris information which is sent by the base station through the satellite;
or,
determining the primary service satellite based on pre-acquired ephemeris information of different satellites.

8. The method according to claim 6, further comprising:
accessing the primary service satellite in response to determining the primary service satellite;
wherein receiving the configuration information sent by the base station comprises:
receiving the configuration information sent by the base station through the primary service satellite;
wherein, the configuration information comprises configuration information of the primary service satellite and/or configuration information of the secondary service satellite.

9. A method for wireless communication, performed by a base station, comprising:
simultaneously transmitting data on a plurality of beams of a satellite,
wherein simultaneously transmitting the data on the plurality of beams of the satellite comprises:
simultaneously transmitting the data on a plurality of beams of one satellite;
simultaneously transmitting the data on a plurality of beams of a plurality of satellites;
wherein the satellite comprises a primary service satellite and a secondary service satellite, and
simultaneously transmitting the data on the plurality of beams of the plurality of satellites comprises:
simultaneously transmitting data on a beam of the primary service satellite and
a beam of the secondary service satellite; and
wherein, an orbit altitude of the primary service satellite is greater than an orbit altitude of the secondary service satellite, and
an operating velocity of the primary service satellite relative to a ground is less than an operating velocity of the secondary service satellite.

10. The method according to claim 3, further comprising:
sending configuration information to a terminal;
wherein, the configuration information is configured for the terminal to determine the plurality of beams for transmitting the data.

11. The method according to claim 10, wherein sending the configuration information to the terminal comprises:
sending a system message carrying the configuration information to the terminal;
or,
sending a RRC message carrying the configuration information to the terminal;
or,
sending an MAC CE carrying the configuration information to the terminal;
or,
sending a physical layer message carrying the configuration information to the terminal.

12. The method according to claim 10, further comprising:
receiving a request message for acquiring the configuration information sent by the terminal;
wherein sending the configuration information to the terminal comprises:

sending the configuration information to the terminal based on the request message.

13. The method according to claim 9, wherein simultaneously transmitting the data on the plurality of beams of one satellite comprises:
    simultaneously transmitting the data on the first beam and the second beam of one satellite determined based on the configuration information.

14. The method according to claim 9, further comprising:
    determining the primary service satellite based on ephemeris information;
    wherein sending the configuration information to the terminal comprises:
    sending the configuration information to the terminal through the primary service satellite;
    wherein, the configuration information comprises configuration information of the primary service satellite and/or configuration information of the secondary service satellite.

15. The method according to claim 14, further comprising:
    sending the ephemeris information to the terminal through the satellite.

16. A communication device, comprising:
    a processor; and
    a memory, configured to store instructions executable by the processor;
    wherein the processor, when running the executable instructions, is configured to implement:
    simultaneously transmitting data on a plurality of beams of a satellite,
    wherein simultaneously transmitting the data on the plurality of beams of the satellite comprises:
    simultaneously transmitting the data on a plurality of beams of one satellite;
    simultaneously transmitting the data on a plurality of beams of a plurality of satellites;
    wherein the satellite comprises a primary service satellite and a secondary service satellite, and
    simultaneously transmitting the data on the plurality of beams of the plurality of satellites comprises:
    simultaneously transmitting data on a beam of the primary service satellite and
    a beam of the secondary service satellite; and
    wherein, an orbit altitude of the primary service satellite is greater than an orbit altitude of the secondary service satellite, and
    an operating velocity of the primary service satellite relative to a ground is less than an operating velocity of the secondary service satellite.

* * * * *